(12) United States Patent
Rogers et al.

(10) Patent No.: US 9,138,641 B2
(45) Date of Patent: Sep. 22, 2015

(54) SYSTEMS AND METHODS FOR MANIPULATION OF OBJECTS

(75) Inventors: Henk B. Rogers, Honolulu, HI (US);
Jared Wiant Eden, Honolulu, HI (US);
Mark Boon, Honolulu, HI (US);
Nicholas Jacob Cook, Honolulu, HI (US)

(73) Assignee: TETRIS HOLDING, LLC, Wilmington, DE (US)

(*) Notice: Subject to any disclaimer, the term of this patent is extended or adjusted under 35 U.S.C. 154(b) by 104 days.

(21) Appl. No.: 13/437,063

(22) Filed: Apr. 2, 2012

(65) Prior Publication Data

US 2012/0322556 A1    Dec. 20, 2012

Related U.S. Application Data

(60) Provisional application No. 61/470,354, filed on Mar. 31, 2011.

(51) Int. Cl.
*A63F 9/24* (2006.01)
*A63F 13/40* (2014.01)
*A63F 13/00* (2014.01)

(52) U.S. Cl.
CPC .............. *A63F 13/10* (2013.01); *A63F 13/005* (2013.01); *A63F 2300/807* (2013.01)

(58) Field of Classification Search
CPC .... A63F 13/06; A63F 2300/1062; A63F 9/24
See application file for complete search history.

(56) References Cited

U.S. PATENT DOCUMENTS

| | | |
|---|---|---|
| 7,302,650 B1 | 11/2007 | Allyn et al. |
| 8,357,045 B2 * | 1/2013 | Youm et al. .................... 463/42 |
| 2002/0042301 A1 * | 4/2002 | Dobrusskin et al. ............ 463/43 |
| 2002/0058541 A1 * | 5/2002 | Mraovic .......................... 463/9 |
| 2003/0179237 A1 | 9/2003 | Nelson et al. |
| 2007/0060338 A1 * | 3/2007 | Kefaloukos et al. ............ 463/30 |
| 2007/0163841 A1 | 7/2007 | Hatcher et al. |
| 2008/0182635 A1 | 7/2008 | Chiu |
| 2009/0137298 A1 * | 5/2009 | Bedingfield et al. ............ 463/9 |
| 2010/0160038 A1 * | 6/2010 | Youm et al. .................... 463/29 |
| 2011/0059792 A1 * | 3/2011 | Fujisawa ........................ 463/30 |
| 2011/0212756 A1 * | 9/2011 | Packard et al. .................. 463/1 |
| 2011/0300932 A1 * | 12/2011 | Henderson ...................... 463/30 |

OTHER PUBLICATIONS

Tetris (by Electronic Arts)—iPhone/iPod Game Play (http://www.youtube.com/watch?v=fH21Ksik7ww&feature=player_embedded)—Uploaded on Dec. 1, 2012; cover pg, figure 1 and figure 2.*
International Search Report and Written Opinion mailed Jun. 26, 2012 for International Application No. PCT/US 12/31877.

* cited by examiner

*Primary Examiner* — Tramar Harper
(74) *Attorney, Agent, or Firm* — Ropes & Gray LLP

(57) ABSTRACT

Systems and methods for manipulating an object include a display for displaying an object where the object has a geometric shape and is arranged in a first orientation of the geometric shape. The display also displays at least a second orientation of the geometric shape in proximity to the object. The system includes a user interface for receiving a user input to select the second orientation of the geometric shape. A processor, in communication with the display and user interface, determines one or more possible orientations of the object including the second orientation and arranges the orientation of the geometric shape of the object to match the selected second orientation.

18 Claims, 40 Drawing Sheets

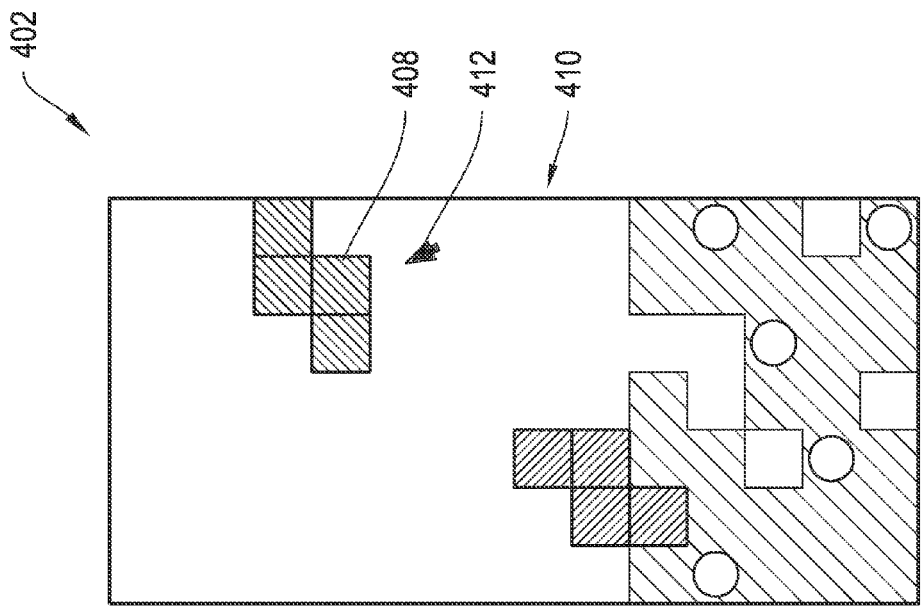
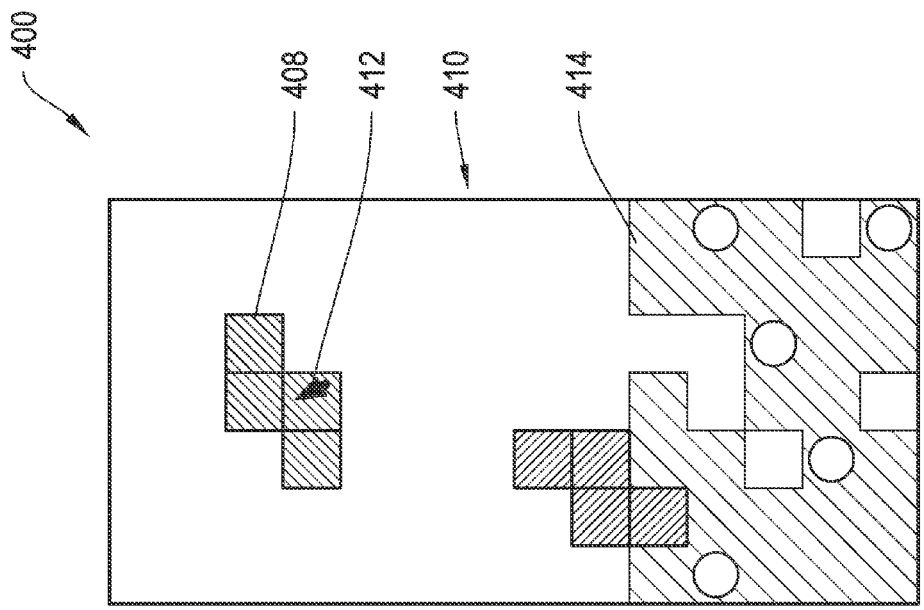
Figure 4A
Figure 4B

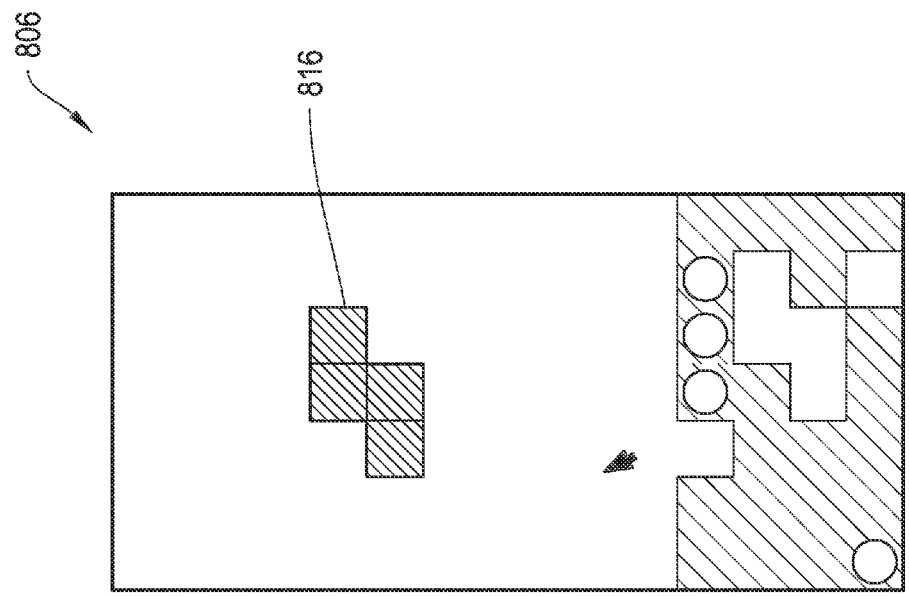
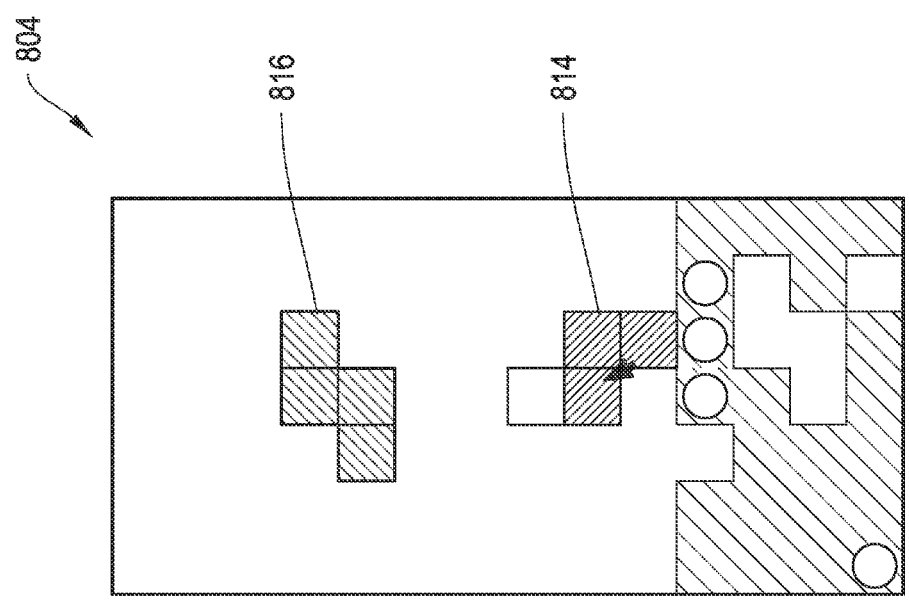

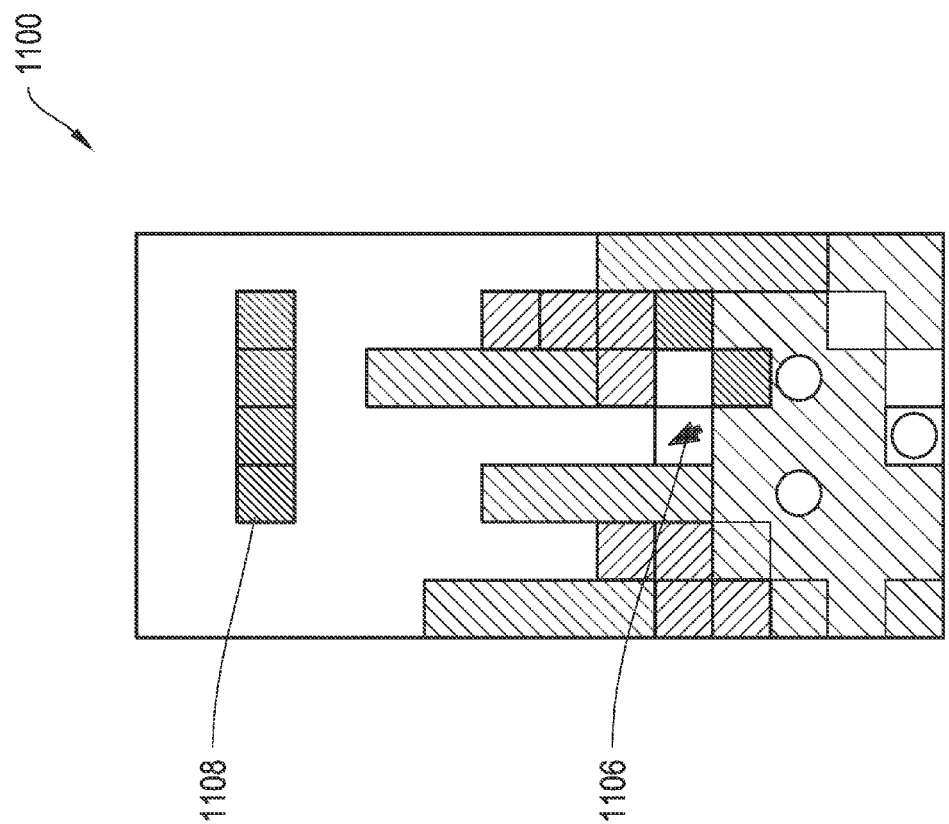

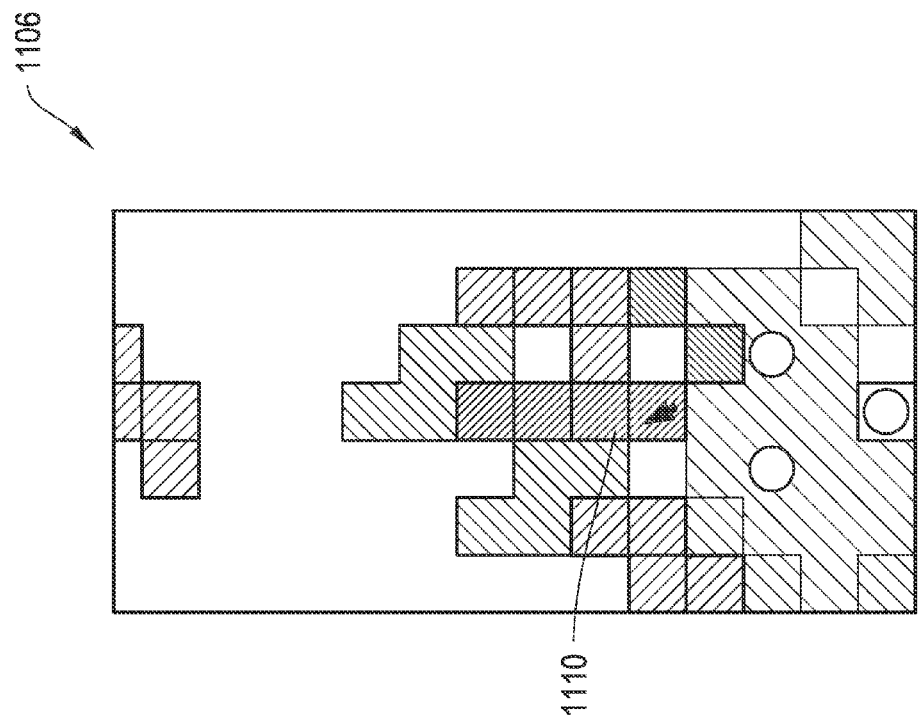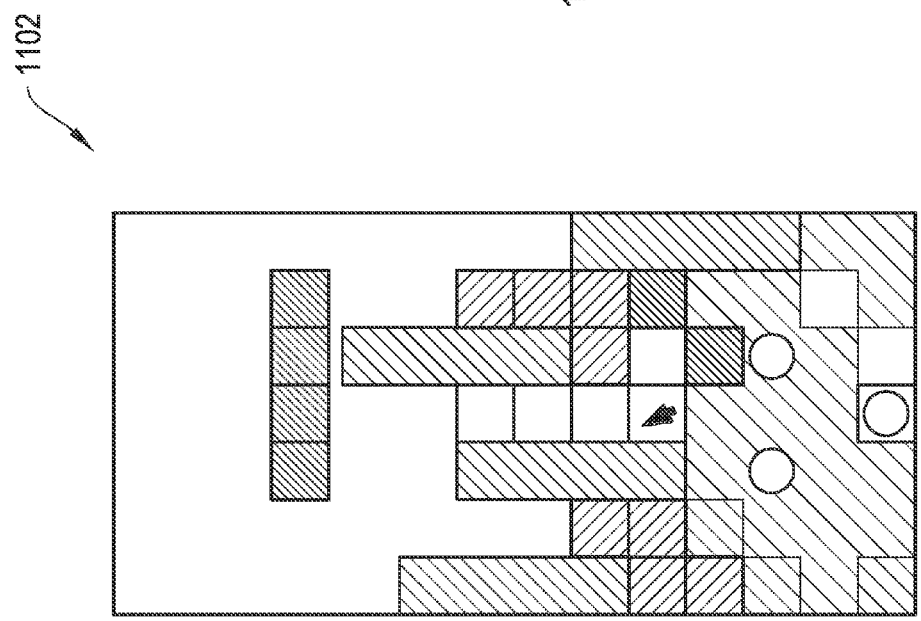

SYSTEMS AND METHODS FOR MANIPULATION OF OBJECTS

REFERENCE TO RELATED APPLICATIONS

This application claims the benefit of and priority to U.S. Provisional Patent Application No. 61/470,354, filed on Mar. 31, 2011, entitled "Systems and Methods for Manipulation of Objects," the entire contents of which are incorporated herein by reference.

FIELD OF THE INVENTION

The application relates generally to systems and methods for manipulating objects of varying shapes and/or sizes. More particularly, in various aspects, the systems and methods manipulate the location and/or orientation of one or more objects as the objects move from a first location to the a second location in real-time or near real-time.

BACKGROUND

Existing manufacturing, packaging, and distribution systems enable the distribution and storage of objects. For example, an airport baggage distribution system tracks and distributes luggage of various shapes and sizes between planes and airport check-in or baggage claim facilities. Package shipping service providers pickup, store, and then distribute packages of various shapes and sizes to various destinations. However, these distribution and storage systems do not provide a way for efficient storage or packing of objects having varying shapes and/or sizes.

Other systems exist that include two-dimensional virtual objects. Electronic puzzle games are a genre of electronic games that emphasize puzzle solving involving virtual objects. The types of puzzles to be solved can test many problem solving skills including logic, strategy, pattern recognition, sequence solving, and word completion.

SUMMARY

To illustrate the technical capabilities of the disclosed systems and methods for manipulating objects, the following aspects are described below.

An object may be a two-dimensional object or a three-dimensional object. A two-dimensional object may be a virtual object such as, without limitation, an object represented on a computer and/or electronic device screen. A three-dimensional object may include a virtual or real object. A real three-dimensional object may include any item such as, without limitation, any consumer product, household product, vehicle, package, container, or item of any size or shape. Two-dimensional or three-dimensional objects may assume any shape or configuration. In some instances, a control interface may utilize a virtual three-dimensional object that is representative of a real three-dimensional object to enable a user and/or system to control the manipulation of the real three-dimensional object by controlling the manipulation of the virtual three-dimensional object.

In certain implementations, operations are applied to the manipulation of any type of objects, including two-dimensional or three-dimensional objects. For example, a system and/or method may be implemented to enhance an item or package distribution system, packaging system, and/or storage system. Any system in which objects require manipulation in real-time or near real-time, while moving from a first location to a second location, may be enhanced by a control system that enables the efficient arrangement of items, having various shapes and sizes in a more compact manner. For example, a control system using the manipulation processes describe herein may allow a user (or an automated computer program) to analyze the size and shape of objects as they are being moved to a container or storage location, and then manipulate the object's location and/or orientation such that the object is optimally placed adjacent to other objects in the storage container or location. This approach may apply to the storage of objects in packages or containers of any size or shape, such as, without limitation, a range of containers including small mail package to a storage hold of a cargo ship or even larger.

In various aspects, the systems and methods provide a user with the ability to play a puzzle game using a pointing device, such as a mouse or remote control device, and for providing additional game control mechanisms and processes associated with the use of a pointing device for interacting with the puzzle game. In some configurations, a touch screen can function as a traditional pointing device such as touch screens for Windows® or MAC® OSX that provide a cursor that tracks a user's touch. However, in other configurations, a touch screen may be employed that, instead of providing a cursor that tracks a user's touch, enables a user to directly manipulate objects and/or other functions via the user's touch on a touch screen (e.g., an iPhone® screen). The systems, devices, and methods herein support both types of touch screen. Furthermore, the systems, devices, and methods may support a multiple-choice type of play style, where other methods of input may include: camera-based eye/gaze tracking, EEG-based thought control (such as NeuroSky® hardware), camera-based body movement and gesture tracking (such as Microsoft® Kinect), buttons to directly select one of the multiple choices (such as, without limitation, an arcade machine or game show buzzer), or microphone-based voice command.

In one aspect, a user is allowed to manipulate two-dimensional virtual objects in the form of various geometric shapes or pieces. Each object and/or piece moves downward toward a bottom of a playing field where the pieces accumulate. Optionally, the pieces may be allowed to move in any direction depending on the system configuration. A user can manipulate the piece by moving it sideways and/or rotating it by 90 degrees to create a horizontal line across a playing field in the line. The form of the pieces may resemble, without limitation, a square, rectangle, triangle, quadrilateral, I-shape, J-shape, L-shape, O-shape, S-shape, Z-shape, and T-shape. Each piece of a particular type of geometric shape may be rotated. For example, the I-shaped piece may be rotated four times to generate two distinct oriented pieces, vertical and horizontal. As another example, the T-shaped piece may be rotated four times to generate four distinct oriented pieces. The O-shaped piece may also be rotated four times, except each oriented piece is identical to one another. A "possible orientation" and an "oriented piece" are used hereinafter to refer to a distinct orientation of a geometric shape. For example, all possible orientations of an I-shape are the two distinct orientations associated with the shape. For example, all possible orientations of a T-shape are the four distinct orientations associated with the shape.

The exemplary puzzle game has a playing field, which is generally mapped with a two dimensional grid comprising cells. These cells have various sizes and shapes. For an example, in FIGS. 3-12, the cell is a square shape. As another example, in FIG. 12, the cell is a circular shape. The square in each piece is the same size as the cell. In this exemplary puzzle game, certain cells of the playing field region comprise one or more rows of partially filled cells at the start of the exemplary puzzle game. The partially filled portion of the playing field region is generally referred to as the Base. In some other implementations, no cells are filled in the region at the start of the exemplary puzzle game and the user can allocate certain pieces to fill up empty cells. Once a row of cells is fully filled, it is cleared, thereby lowering the height of the Base.

At the start of this exemplary puzzle game, or a session of the exemplary puzzle game, the system automatically provides a user with a default piece. For the following discussions, the number of rows, including any filled and/or empty cells contained therein, of the Base after a piece is placed at a particular position in the playing field is referred to as the "outcome". Each outcome is associated with one or more steps that either the user or the game system takes to reach the outcome. For example, a user may take a first step by choosing a position on the Base for placing a given piece. At a subsequent step, the user may then select a particular orientation of the piece for the selected position by rotating the piece. The series of steps taken from when a default piece is provided to a user to when the piece is placed to reach a certain outcome is referred to collectively as a "move".

The exemplary puzzle game is typically played using a keyboard or a multi-button input device. However, this would normally require the use of at least three unique buttons for interacting with the exemplary puzzle game, two of which are typically needed for controlling the horizontal movement of a falling piece and a third button is typically needed for rotating the piece. Coordinating multiple buttons under time pressure increases the difficulty of the game and may be undesirable for certain users, e.g., beginners. It also limits the user to only input devices with several buttons or inputs, such as a keyboard.

Accordingly, there exists a need in the art for allowing a user to move objects displayed on an electronic device using an input device other than a keyboard. There exists another need for implementing additional control mechanisms and processes for a pointing-device-controlled puzzle game system. There exists a further need for designing an interface to an application such as a puzzle game application that can be easily adapted to or be implemented on a variety of other platforms and systems.

The disclosed systems, methods and devices, in various implementations, address deficiencies in the prior art by providing a user with the ability to manipulate objects for any application and/or any puzzle game on an electronic device using a pointing device, such as a mouse or a touch-screen, and for providing additional control mechanisms and processes associated with the use of the pointing device for controlling a puzzle game.

In one aspect, a user can select a puzzle piece using a mouse control by clicking on or hovering over a cell of the selected piece. The user can drag the selected piece to a desired location on the interactive and/or virtual playing field by holding onto the click without releasing it. The selected piece follows the movement of the mouse and can be placed, or dropped, by a user by releasing the mouse click after moving the selected piece over the top of a desired empty cell above the Base. The systems may optionally include additional processes for assisting a user during the mouse-controlled game-play. In one implementation, the system determines coordinates of all possible cells that may be filled up by a piece of a particular geometric shape in response to a user selecting one or more cells in the playing field region. Based on the determined coordinates, the system maps the potentially filled-cells onto the playing field. Based on the mapping, the user can decide the exact move for a piece including a particular orientation for the piece. In another implementation, the system can determine several non-overlapping best moves or available moves for a given piece. Mappings of cells corresponding to the outcomes of best moves are provided to the user. Based on the various mappings corresponding to the best outcomes, the user can select a desired move by selecting one of the cells in the selected mapping.

Accordingly, the system places the piece in its most optimal orientation associated with the best move to fill up the remaining cells. A piece in its most optimal orientation associated with the best move is referred to as the "best piece" hereinafter. In yet another implementation, a user is provided with the option to select a cell outside the mapping associated with a best move. Additionally, the system can also determine the best move for a selected cell and automatically places its associated best piece to fill up the selected cell for the user. For the foregoing implementations, the system may additionally determine a best-fit piece, or rescue-piece, for a user such that, when used strategically, the piece can help the user to advance further in the game, such as to clear one or more rows of cells in the Base.

In another aspect, a system includes a processor for running an application on a system and/or portable electronic device. The processor may access and/or use a non-transitory computer readable medium having program codes that cause the processor to perform certain functions, applications, and/or routines including displaying an object via a display. The object may have a particular geometric shape and be arranged in first orientation of the geometric shape. The processor may determine one or more orientations of the object including a second orientation. The one or more orientations may be determined based on the possible destination orientations available to the object. The processor may display at least the second orientation of the geometric shape in proximity to the object. The system and/or device may include a user interface and/or user input device that receives a user input to select the second orientation of the geometric shape of the object to match the selected second orientation. The processor, in communication with the display and/or interface, may then arrange the orientation of the geometric shape of the object to match the selected second orientation.

In a further aspect, a system and/or device may be used to manipulate a first object in relation to one or more other objects. The system may include a computer that uses a computer readable medium operatively coupled to the computer. The computer readable medium may store program codes causing the computer to perform functions, applications, and/or subroutines that display the one or more other objects on a display such that each of the other objects is arranged adjacent to at least another object of the other objects. Each of the other objects may have a geometric shape and be arranged in a particular orientation of a geometric shape. Each of the one or more other objects may be arranged to be non-overlapping with respect to any other objects. According to one implementation, the processor displays the first object in a first position on the display where the first object has a geometric shape and is arranged in a first orientation of its geometric shape. The processor may receive a user input, via a user interface and/or user input device, to select a destination position and orientation of the first object, where the destination position is adjacent to at least one of the other one or more other objects. The first object may be non-overlapping with respect to any one of the other objects. In response to the user input, the processor positions and orients the object at the destination position and orientation. The destination position and orientation and/or destination position and orientation candidate may also be referred to as an outcome.

BRIEF DESCRIPTION OF THE DRAWINGS

The foregoing and other objects, features, advantages, processes, and illustrative implementations of the invention will now be described with reference to the following drawings in which like reference designations refer to the same parts throughout the different views. These drawings are not necessarily to scale, emphasis instead being placed upon illustrating principles and technical features provided by the systems and methods. The graphics and visual expression of the game, such as the various game objects, depicted in FIGS. 3-12 and descriptions associated with these graphics are purely illustrative. The disclosed systems and methods are equally suitable for any other types of games and are capable of depicting any graphics associated therewith.

FIGS. 10A-11C show more exemplary screen shots of the mouse-controlled puzzle game for illustrating more input control processes associated with the mouse-controlled game.

DESCRIPTION

The systems and methods enable the manipulation of three-dimensional or two-dimensional objects in real-time or near real-time as the objects move from one location to another. In some implementations, the systems and methods provide a user with the ability to play a puzzle game using pointing-device game control, such as a mouse, and for providing additional game control mechanisms and features associated with a pointing-device to the user for controlling the puzzle game. In some configurations, a touch screen can function as a traditional pointing device such as touch screens for Windows® or MAC® OSX that provide a cursor that tracks a user's touch. However, in other configurations, a touch screen may be employed that, instead of providing a cursor that tracks a user's touch, enables a user to directly manipulate objects and/or other functions via the user's touch on a touch screen (e.g., an iPhone® screen). The systems, devices, and methods herein support both types of touch screen. Furthermore, the systems, devices, and methods may support a multiple-choice type of play style, where other methods of input may include: camera-based eye/gaze tracking, EEG-based thought control (such as NeuroSky® hardware), camera-based body movement and gesture tracking (such as Microsoft® Kinect), buttons to directly select one of the multiple choices (such as, without limitation, an arcade machine or game show buzzer), or microphone-based voice command.

For the following discussions in relation to FIGS. 1-10, it is assumed that a mouse is used as the pointing device for controlling the puzzle game. However, it should be noted that various other types of input devices may be used in addition to, or in replacement of, a mouse including, without limitation, a touch screen, a remote control, trackball, keypad, touch pad, stylus input, joystick, and voice recognition interface. Additionally, while the following discussions assume a network-based system for providing a web-based puzzle game, the systems described herein may be realized as program instructions that provide a pointing-device-controlled puzzle game that can be locally stored in a user device and that would allow a user to play the game off-line. The locally stored program instructions of the puzzle game may be pre-stored in the user device or downloaded to the device via the internet and/or other communication mechanisms.

Figure 1:
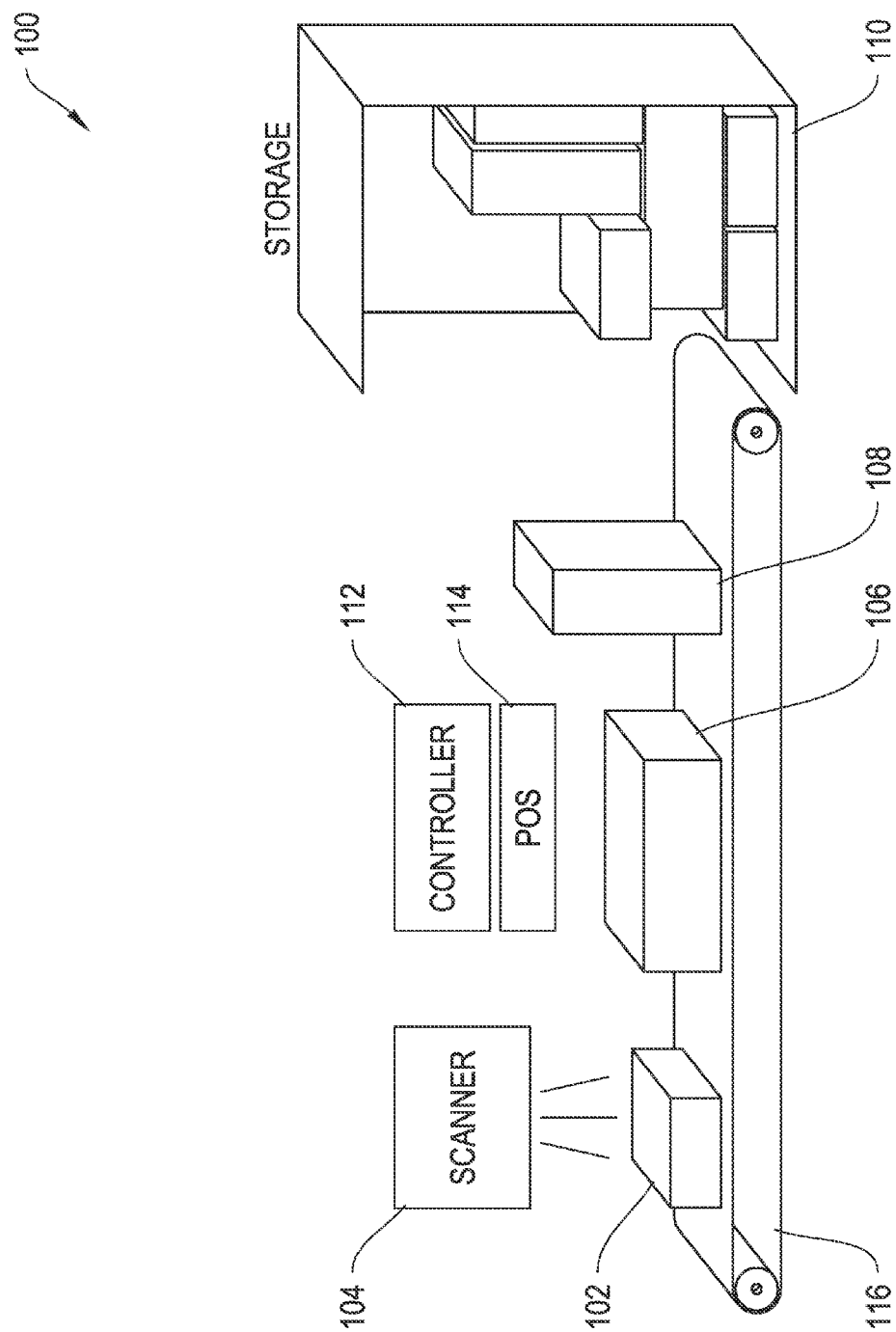
FIG. 1 shows an object storage system where packages of various shapes and sizes are arranged in a storage container.

FIG. 1 shows an object placement system 100 where packages 102, 104, and 106 of various shapes and sizes are arranged in a storage container 108. The object storage system 100 includes a scanner unit 104, a position and orientation system (POS) 114, an object transport unit 116, package container 110, and controller 112. The scanner unit 104 may be arranged to scan objects or physical items, e.g., packages, to determine their size and shape. The scanner unit 104 may include an optical, laser, and/or sonic type of scanning system. The scanner unit 104 may use any type of algorithm, e.g., a level set method, to identify and/or determine the shape and size of objects 102, 106, and/or 108. The POS 114 may be arranged to position and/or orient objects, and then to arrange or stack the objects in a best fit position within the container 110. The transport system 116 may include any system capable of moving an object from the scan position to the container such as, without limitation, a conveyor belt. The controller 112 may interface with the other units of the system 100 to provide control of the packaging process. The controller may include a user interface. The user interface may include a graphical user interface (GUI). In certain configurations, the GUI provides a 3-dimensional or 2-dimensional representation of packages 102, 106, and/or 108 to enable a user to position each object in the optimal position and orientation in the container 110. The controller 112 may enable a user to use any one or more of the techniques described with respect to FIGS. 2-15 herein to affect the most efficient placement of packages 102, 106, and/or 108 within the container 110.

It should be understood by the skilled person that the object placement system 100 can apply to any type of object in various environments. For example, the object placement system 100 may be configured to scan stones of various shapes and sizes, and then orient and place each stone within a wall or like structure in an optimal manner.

Figure 2:
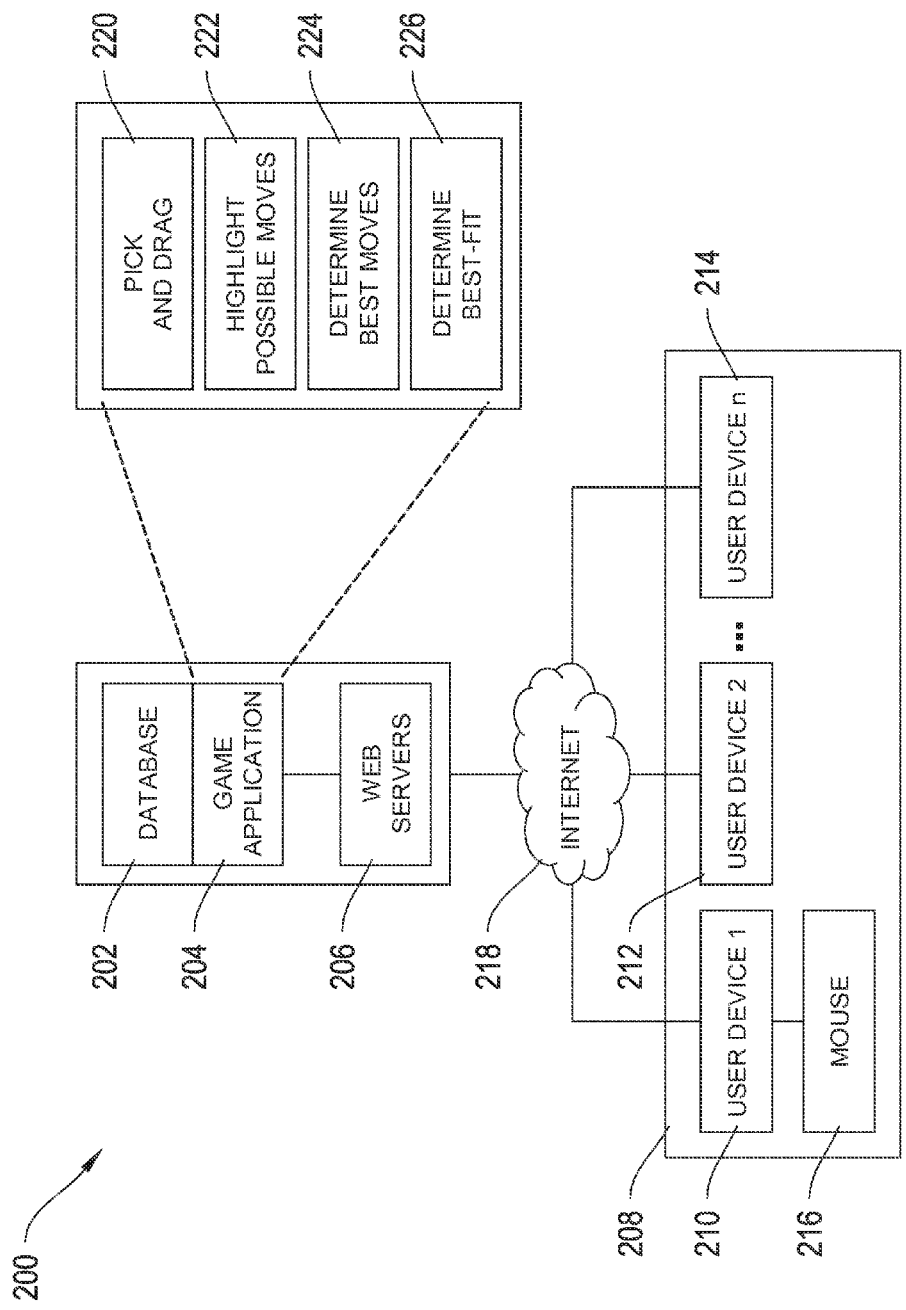
FIG. 2 is a network diagram of a pointing-device controlled puzzle game system.

FIG. 2 is a network diagram of an illustrative pointing-device-controlled puzzle game system 200. The puzzle game system 200 includes a database 202 storing a game application 204 associated with a pointing-device-controlled puzzle game on one or more web servers 206. The end-user system 208 includes a plurality of user devices 210, 212, and 214. Each user device 210, 212, and/or 214 has associated with it at least one form of user input device. For example, user device 210 has associated with it a mouse 216 for allowing a user to interact with various programs and applications implemented on the user device 212. The web servers 206 of the puzzle game system 200 can communicate with each user device 210, 212, and/or 214 in the end-user system via a network 218 such as the Internet.

In operation, a user request to play a mouse-controlled puzzle game is sent from a web browser implemented on the user device 210 to the web servers 206 of the puzzle game system 200 via the network 218. In response to this request, the web servers 206 retrieve source code corresponding to the game application 204 from the database 202 and send the source code to the web browser implemented on the user device 210. The source code includes various program instructions that may be written in various programming languages, including scripting languages, such as JavaScript, Adobe Flash, Adobe Flash ActionScript, HTML5, and Silverlight. Examples of web browsers capable of rendering the graphics and/or objects associated with the puzzle game (see FIGS. 4-12) include Internet Explorer, Firefox, Chrome, Safari, and any other mobile browsers. The source code may contain library functions, or subroutines. Accordingly, function libraries, such as DoJo toolkit for JavaScript, may be stored locally with the web servers and/or the databases of the puzzle game system. It should be noted that although much of the web-based graphics rendering and/or computing is typically done by a web browser locally, some portions of the rendering of a graphical user interface may be done by the web servers 206 of the puzzle game system 200.

In some implementations, the program instructions of the game application 204 include code corresponding to various input-control processes unique to a pointing-device-controlled puzzle game system. As an illustrative example, FIG. 2 further depicts four illustrative non-limiting input-control processes defined by various subroutines within the program instructions associated with the puzzle game application. These processes are "Pick and Drag" 220, "Map Possible Moves" 222, "Determine Best Moves" 224, and "Determine Best Fit" 226. These processes may include additional processes embedded within and may be connected to one another or be executed concurrently by the main game control process of the game application. A brief description of their capabilities, when their corresponding instructions are executed by a web browser, an operating system, a computer, a processor, and/or any other program, is offered below with additional details described in relation to FIGS. 4-12. The game application 204 also includes executable program instructions corresponding to a rotation system for determining the different orientations of a geometric shape presented to a user.

The "Pick and Drag" control process 220, in one exemplary implementation, provides a user with all possible orientations of a piece for a particular geometric shape. A user can select a desired piece in a particular orientation using a mouse by clicking on the desired piece. The user can then drag the selected piece and place it on a user-desired position or cell by releasing the mouse click.

In certain implementations, the "Map Possible Moves" process 222 can be invoked in response to a user hovering over or clicking on an empty cell above a base of objects. The "Map Possible Moves" process 222 determines if a piece in all of its orientations could fit into the hovered-over empty cell. For every piece of every possible orientation that could fit into the empty cell, the "Map Possible Moves" process 222 can, in certain configurations, determines coordinates of all the cells that could be filled by the piece. Different outcomes corresponding to different orientations of a given piece are then determined and superimposed on one another. The user is provided with the superimposed mappings of the different outcomes for the given piece, from which a user is given the option to select a desired orientation for the piece. This way, a user avoids having to mentally think ahead of time of all the possible outcomes for a given puzzle piece when deciding which orientation and position to select for a particular piece.

The "Determine Best Moves" control process 224 determines one or more best moves for a falling default piece (e.g., a piece and/or object moving from a first position to a second position in a substantially vertical direction) for a position or cell selected by a user clicking on or hovering over an empty cell. This pointing device game control process employs the execution of an artificial intelligence algorithm that may be based on Bayesian and/or any other proprietary or non-proprietary machine learning algorithms. The "Determine Best Moves" control process 224 determines coordinate data, i.e., X and Y values about the distribution of filled and empty cells in the base (where multiple other objects and or pieces accumulate generally adjacent to each other) near the user-selected cell. The process 224 then pre-determines for a default piece all of its possible outcomes by determining, for each orientation of the piece, the distribution of empty and filled cells of the base after the piece is placed at the user-selected cell. Each outcome associated with a piece of a particular orientation is defined by the height and width of the base and any gaps contained therein after a piece is placed to fill the user-selected empty cell. The height and width information of an outcome may be stored in a two dimensional array of the base and is updated every time a user makes a move.

The process 224 may use various metrics for determining whether a particular move is considered the best among all possible moves. For example, these metrics may include the height to width ratio and the number and position of any empty cells, or gaps, within the base associated with each outcome. Based on these metrics, the pointing device game control process assigns a score to each move. The process 224 then ranks the assigned scores and selects a move having the highest score as the best move. In some cases, the process 224 may select the first two best moves or any other pre-defined number of best moves for a user. In some configurations, as further described in relation to FIGS. 10-11, outcomes for a given piece at all positions on the base are determined. For a given piece, mappings of filled-cells, or distributions of filled-cells, according to the best outcomes are determined and provided to a user. In other configurations, the pointing device game control process 224 selects two, or some other pre-determined number of, best outcomes associated with mappings of filled-cells that are non-overlapping with one another.

The "Determine Best Fit" pointing device game control process 226 provides a user with the most-needed geometric shape, while a game is in session, thereby lowering the difficulty of the game for a user or, in some instances, "rescuing" the user from losing a game. According to one exemplary implementation, the program instructions corresponding to control process 226 first determine the positions of empty cells, or gaps, in a base and/or the height of the base in the playing field, display, display screen, and/or display area. The control process 226 defined by these instructions then determines whether there exists a piece and/or object such that once added to the base, it would increase the user's score, for example, by clearing one or more rows of cells in the base. The program instructions of control process 226 may partially employ or invoke the program instructions of the other control processes described above for determining the outcomes of all pieces in all of their possible orientations. The subroutine corresponding to the "Determine Best Fit" control process 226 may be triggered in response to satisfaction of several trigger conditions including a distance between the height of the base and a threshold height and/or the amount of elapsed time in a game relative to a threshold level. The threshold level may be considered the position where a piece and/or object is first displayed. Once determined that a best-fit piece exists, a user may be provided, among other choices, with the rescuing piece.

As mentioned above, additional details associated with these main control processes of the mouse-controlled puzzle game are discussed in relation to FIGS. 4-12. It is also noted that various other control processes are described in the descriptions of these figures.

Figure 3:
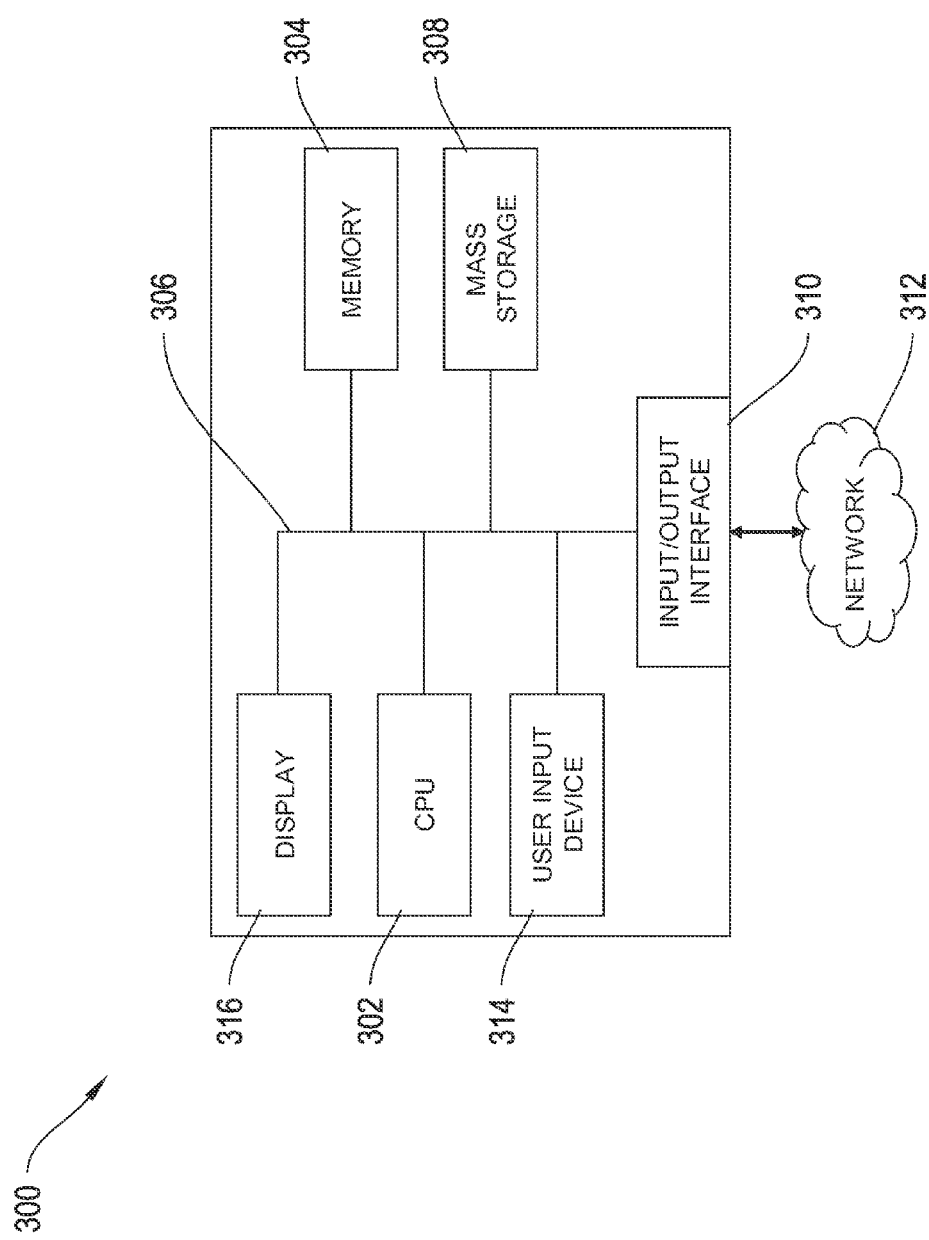
FIG. 3 is a functional block diagram of a general purpose computer system.
Figure 4C:
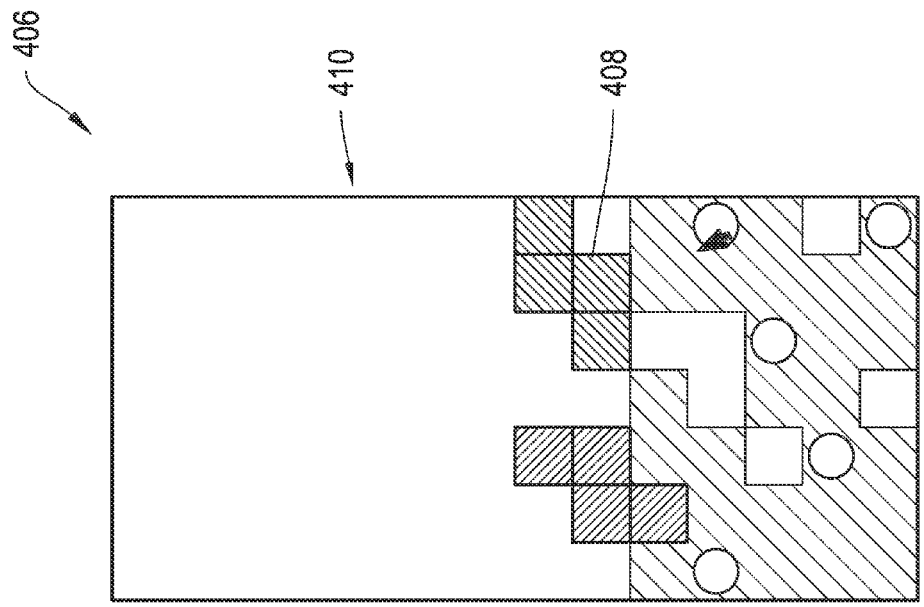
FIGS. 4A-5D show exemplary screen shots of the exemplary puzzle game being controlled by a user using a mouse, a first exemplary pointing-device (referred to as "a mouse-controlled puzzle game" hereinafter).
Figure 4D:
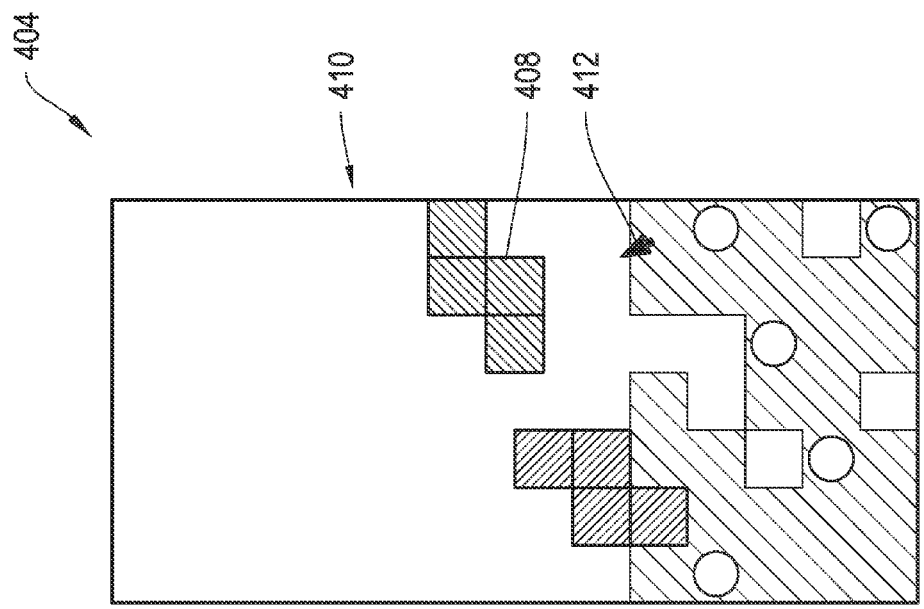

FIG. 3 is a functional block diagram of a general purpose computer accessing a network. The database, the web servers, and the user devices shown in FIG. 2 may be implemented as a general purpose computer 300 shown in FIG. 3.

The exemplary computer system 300 includes a central processing unit (CPU) 302, a memory 304, and an interconnect bus 306. The CPU 302 may include a single microprocessor or a plurality of microprocessors for configuring computer system 300 as a multi-processor system. The memory 304 illustratively includes a main memory and a read-only memory. The computer 300 also includes the mass storage device 308 having, for example, various disk drives, tape drives, etc. The main memory 304 also includes dynamic random access memory (DRAM) and high-speed cache memory. In operation and use, the main memory 304 stores at least portions of instructions and data for execution by the CPU 302.

The computer system 300 may also include one or more input/output interfaces for communications, shown by way of example, as interface 310 for data communications via the network 312. The data interface 310 may be a modem, an Ethernet card or any other suitable data communications device. To provide the functions of a computer according to FIG. 2, the data interface 310 may provide a relatively high-speed link to a network 312 and/or network 218, such as an intranet, internet, or the Internet, either directly or through another external interface. The communication link to the network 312 may be, for example, optical, wired, or wireless (e.g., via satellite or 802.11 Wi-Fi or cellular network). Alternatively, the computer system 300 may include a mainframe or other type of host computer system capable of web-based communications via the network 312.

The computer system 300 also includes suitable input/output ports or may use the interconnect bus 306 for interconnection with a local display 316 and user input device 314 or the like serving as a local user interface for programming and/or data entry, retrieval, or manipulation purposes. Alternatively, server operations personnel may interact with the computer system 300 for controlling and/or programming the system from remote terminal devices via the network 312.

The components contained in the computer system 300 are those typically found in general purpose computer systems used as servers, workstations, personal computers, network terminals, portable devices, and the like. In fact, these components are intended to represent a broad category of such computer components that are well known in the art. Certain aspects may relate to the software elements, such as the executable code and database for the server functions of the web severs 206, game application 204, including functions 220, 222, 224, and executable code for the browser functions or operating systems implemented on various user devices 210, 212, and/or 214.

FIGS. 4A-5D show exemplary screen shots of the exemplary puzzle game 204 being controlled by a user using a mouse (e.g., mouse 216) and/or another type of pointing device. In particular, FIGS. 4A-4D show sequential snapshots 400, 402, 404, and 406 of a mouse 210 moving a puzzle piece 408 across a display and/or display screen 410. As depicted in these figures, a cursor 412 controlled by the mouse 210 shown in FIG. 2 is displayed in an interactive playing field and/or screen 410 of the mouse-controlled puzzle game 204. An S-shaped puzzle piece 408 of a particular color is falling towards the base 414. The base 414 may be defined by the empty and filled cells in the playing field, which also define the height and gaps of the base 414. The base 414 may include multiple pieces and/or objects where at least one object is adjacent to another object. In some configurations, a user can control the horizontal movement of the S-shaped piece 408 by moving the mouse left and right without clicking the mouse. In other configurations, such as when the "Pick and Drag" process 220 is being executed, the user can control the directional movement of a piece 408 by first clicking on a desired piece using a mouse button and then dragging the piece to move in any direction. These sequential exemplary screen shots 400, 402, 404, and 406 end with FIG. 4D depicting showing the exemplary outcome of placing the S-shaped piece 408 at a horizontal position selected by the user.

Figure 5A:
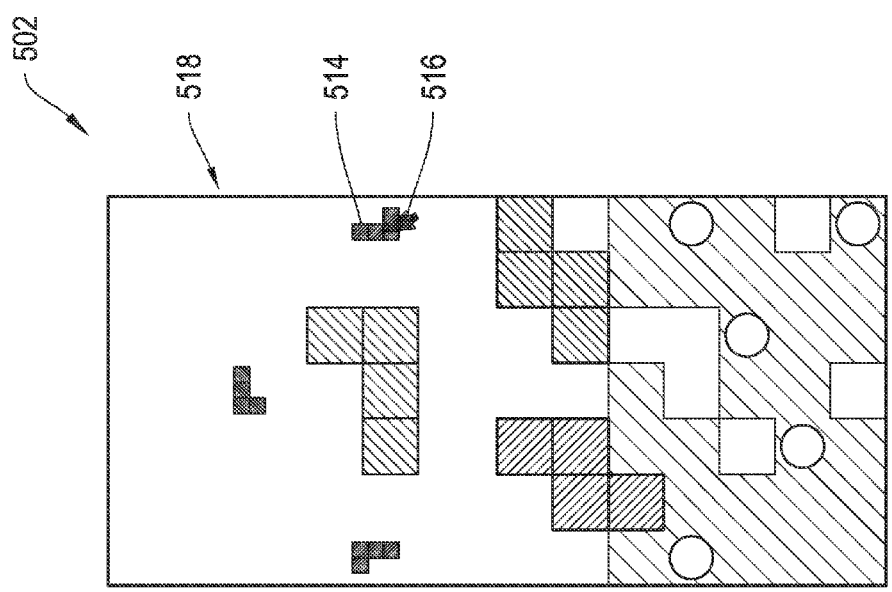
Figure 5B:
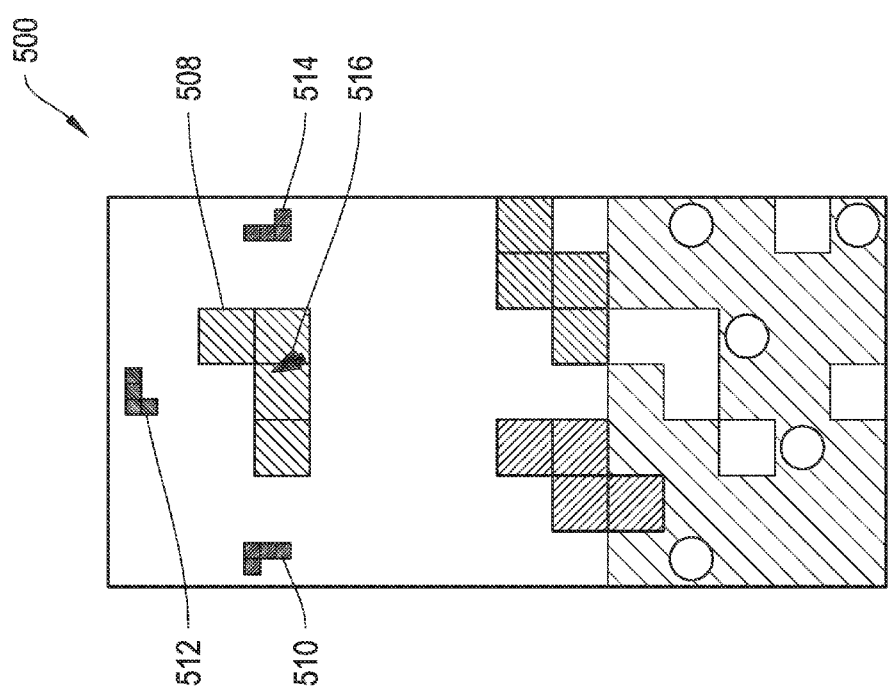
Figure 5D:
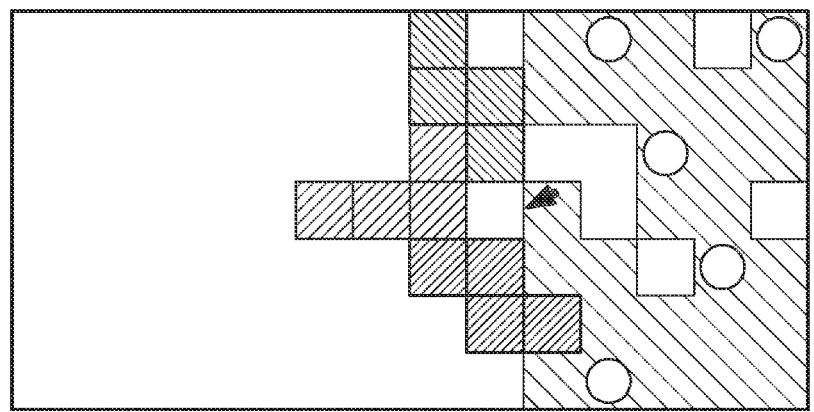
Figure 5C:
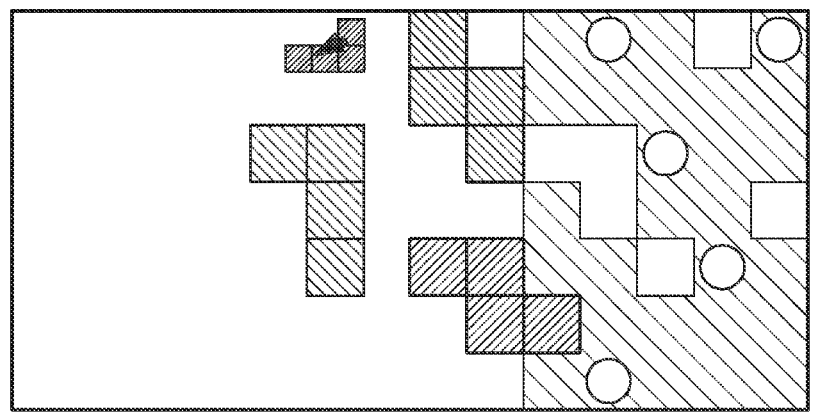

FIGS. 5A-5D depict screen shots 500, 502, 504, 506 and various steps associated therewith, generated by the program instructions corresponding to the "Pick and Drag" control process 220. As can be seen in these figures, a user is provided with four possible orientations 508, 510, 512, and 514 of an L-shaped piece 508 including the default orientation 508 of the piece 508. The alternate orientations 510, 512, and 514 are located in proximity with and/or surround the piece 508. To trigger the process to provide the additional orientations, a user can hover over the default piece with a mouse cursor 516. The hover subroutine associated with the source code detects this input and generates the other orientations 510, 512, and 514. A user can select one of the orientations 510, 512, and 514 by simply moving the mouse cursor 516 over top of a desired piece having the desired orientation 510, 512, and/or 514. For example, FIG. 5B shows the cursor 516 over the orientation 514. In response, coordinates of cells corresponding to the desired piece are determined and the cells are accordingly mapped in the playing field and/or display 518. If a user clicks on the desired piece without releasing the click, the desired piece is attached to the cursor 516 navigated by the mouse 216 and follows the movement of the mouse cursor 516 to any location in the interactive playing field and/or display 518 including a location higher than the position that the piece was in when picked up by the mouse 216. The user can then drag the piece 508 and drop it to a desired cell at a user controlled speed (depending on how fast a user can drag the piece using a mouse 216 towards the cell). While the default piece 508 typically falls at a speed determined by the game system 204, the user can override the default speed once a piece 508 is picked up by the user.

Figure 6:
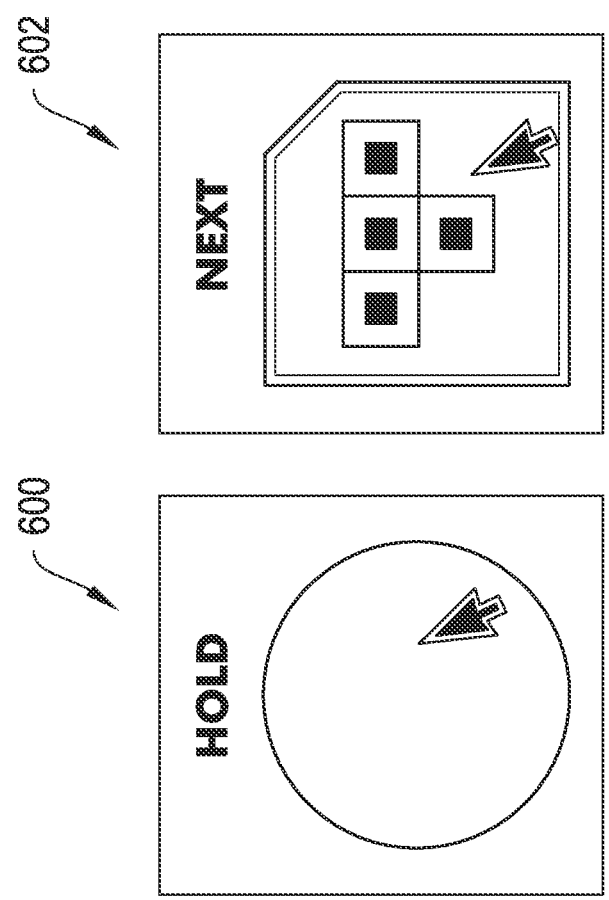
FIG. 6 shows exemplary icons of two control processes associated with the mouse-controlled puzzle game.

FIG. 6 shows exemplary icons 600 and 602 of two control processes associated with the mouse-controlled puzzle game system 204. Depicted icons 600 and 602 correspond to the "hold" and the "hard drop" control processes of the puzzle game system respectively. The hold process allows a user to skip a piece and use it later. The skipped piece is not discarded and is simply kept in a queue for later use. The hold process is useful because a user may decide that it is more strategic to keep a particular puzzle piece for later as doing so would produce a more favorable outcome. In the case of a packaging system 100, the hold feature may allow the user to queue a certain number of physical items that a particularly difficult to position for later selection and positioning. The game application 204 may track the use of this pointing-device control process and, in some instances, may deduct a pre-determined amount of points from a user's score as the game is now less dictated by the system 200 and more so by the user, thereby decreasing the difficulty of the game 204. Alternatively, a user may be given fewer points if one or more rows were to be cleared by a piece after the skipped-over piece. This control process allows the user to alter the sequence of pieces generated by the game 204, which is typically generated randomly according to a random number generator. In some instances, the sequence of the pieces generated is strategically pre-defined and is, therefore, not random.

In certain implementations, the hold process is deactivated when the "Determine Best Fit" subroutine 226 is being invoked by the game system 200 to assist a user during the game-play. In other words, when the game system 200 is assisting the user by giving the user the best-fit piece, the user is prevented from using the hold control process as it is unnecessary to skip over a best-fit piece. The next icon 602 corresponds to the hard drop control process. When a user input invokes this process, the game application drops the puzzle piece directly to the base. Depending on the setting and the version of the mouse-controlled puzzle game 204, a user may be limited to the number of times that the hold and/or hard drop processes may be used based on, for example, elapsed time or the number of game sessions finished in a game.

Figure 7A:
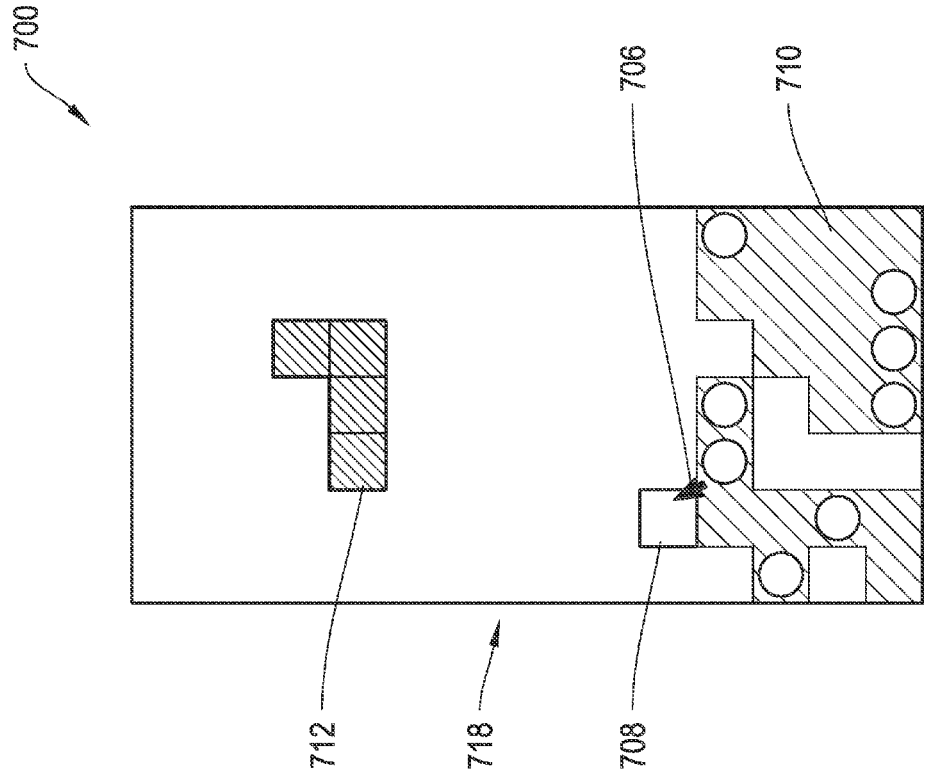
FIGS. 7A-9C show additional exemplary screen shots of the mouse-controlled puzzle game for illustrating additional input control processes associated with the game.
Figure 7C:
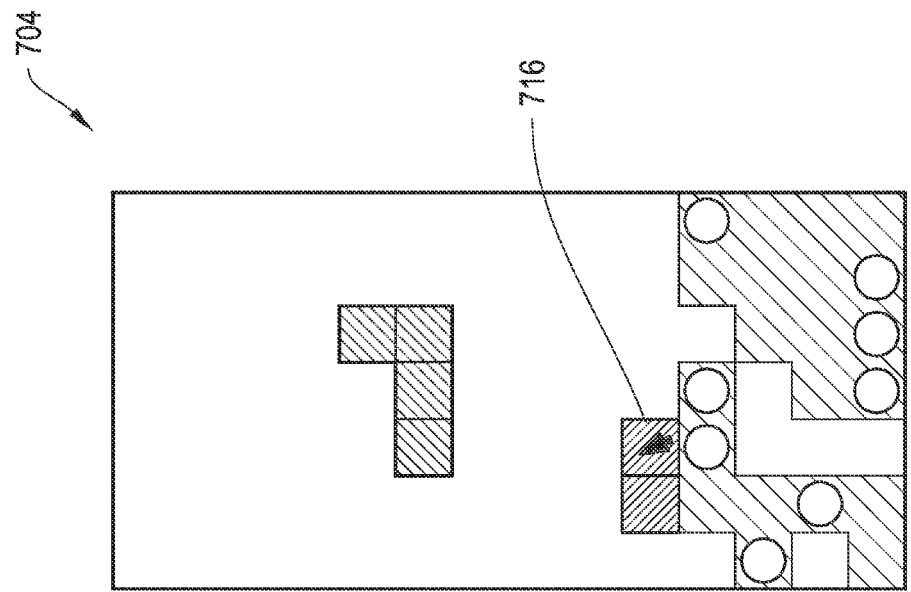
Figure 7B:
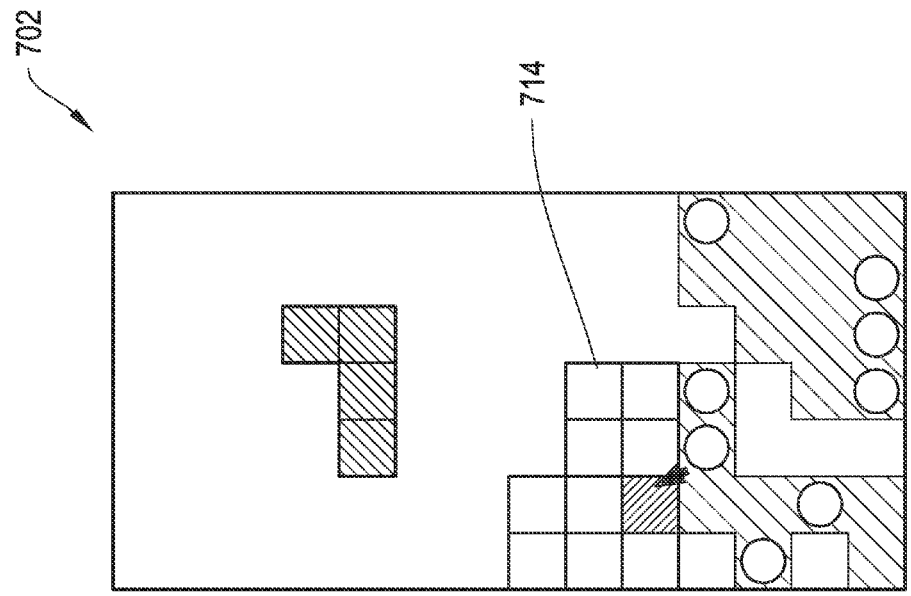

FIGS. 7A-9C show additional exemplary screen shots of the mouse-controlled puzzle game for illustrating additional input control processes associated with the exemplary puzzle game. In particular, FIGS. 7A-8C show exemplary screen shots 700, 702, 704, 800, 802, 804, 806, and 808 of the exemplary mouse-controlled puzzle game when program instructions corresponding to the "Map Possible Moves" process 222 are being executed. As depicted in FIGS. 7A-7C, a user hovers a mouse cursor 706 over an empty cell 708 above and/or in the base 710. In response to the hovered-over cell 708, the "Map Possible Move" process 222 determines if any part of the piece 712 in all orientations could fit into the hovered-over cell 708. If the process determines that at least part of the piece 712 in all orientations could fit into the hovered-over cell 708, the user is informed of all cells such as cells 714 that would be filled by placing any orientation of the piece 712 at the hovered-over cell 708. If a user clicks on any of the would-be-filled cells such as cell 708, all empty cells 714 around the selected empty cell 708 that would include the piece 712 are mapped as shown in FIG. 7B. These additionally mapped cells 714 are cells that may be filled by one or more orientations of piece 712 when placed at the position selected by the user. A user can narrow down which cells to fill by dragging a cursor over to a cell 716 adjacent to the previously selected empty cell 708. As a user selects additional cells to narrow down the exact cells to fill up, these user-selected cells assume the same characteristics as those of the piece 712 to be placed at the selected cells. Since all outcomes defined by all cells that will be filled up by all orientations of a piece are determined, selecting additional cells within these determined cells would reduce the number of possible outcomes for a given geometric shape. This way, the total number of moves available for the shape of, for example, piece and/or object 712, is narrowed down based on the user's selection of the would-be-filled-up cells. As mentioned above, the additional cells assume the same characteristics as those of the falling piece. This way, the difficulty of the exemplary puzzle game 204 is lowered as a user is essentially provided with different solutions to solving the exemplary puzzle game 204.

Figure 8B:
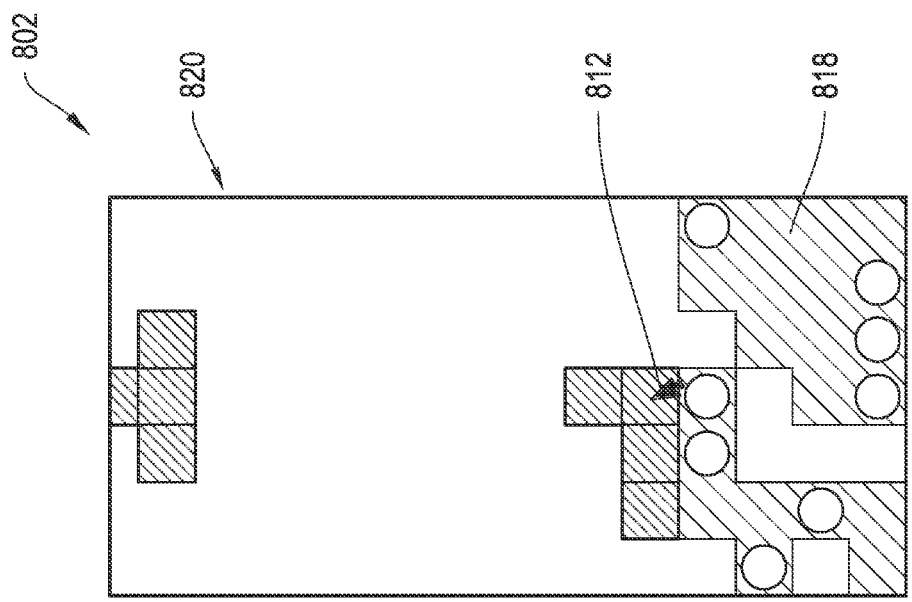
Figure 8A:
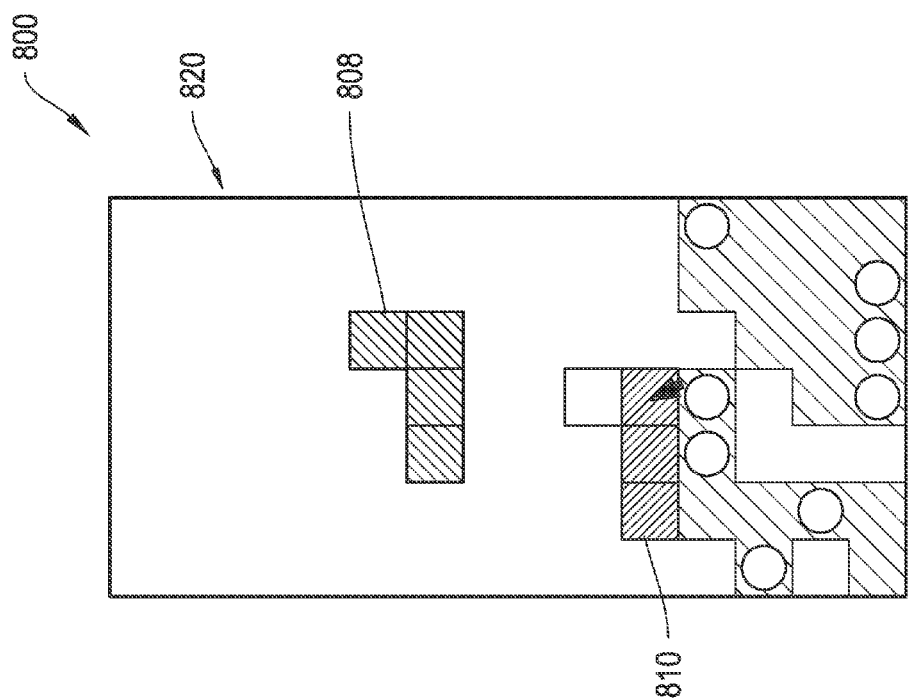

As another example, FIGS. 8A and 8B show that the game application 204 determines only one possible outcome for the L-shaped piece 808 in order to fill the three selected empty cells 810. Once a user selects the three mapped cells 810 and releases the mouse button, the L-shaped piece 808 of the horizontal orientation is automatically placed accordingly to the pre-determined outcome for this placement (position) and orientation 812 of the geometric shape.

FIG. 8C illustrates yet another exemplary implementation in which, with more cells 814 selected by a user, the user is limited to only one possible position and orientation of the depicted piece 816 for filling the selected empty cells. If a user decides to cancel the selected empty cells, a user can drag the mouse cursor away from the selected cells 814 to any other position in the region or outside the region. FIG. 8D depicts an exemplary screenshot 806 of the exemplary puzzle game after a user cancels the selected cells 814.

Figure 9A:
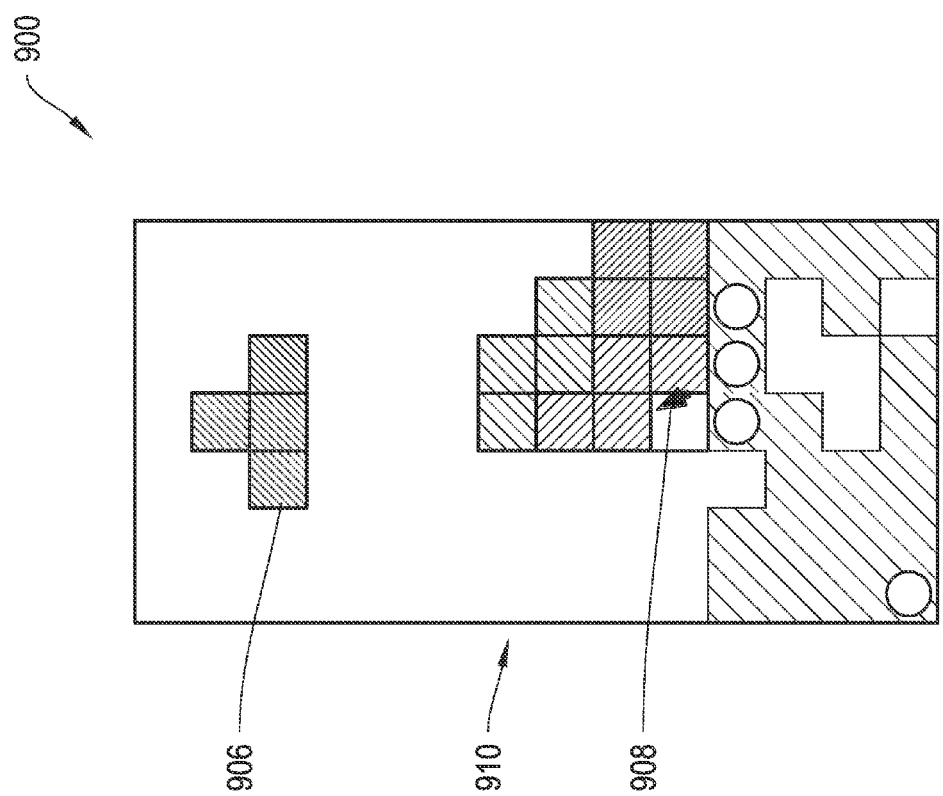
Figure 9C:
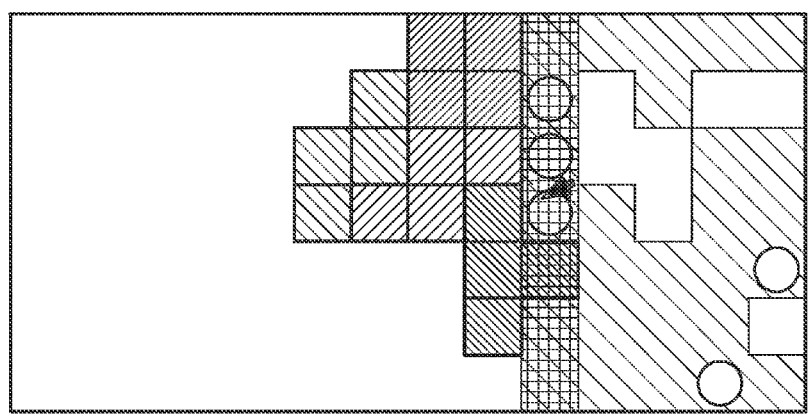
Figure 9B:
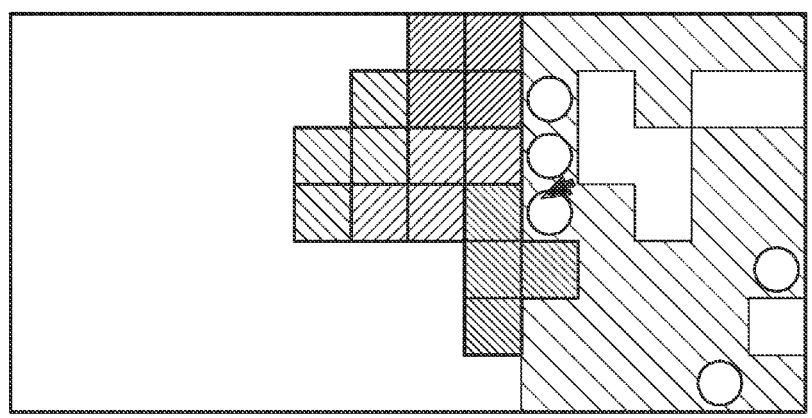

FIGS. 9A-9C depict screen shots 900, 902, and 904 of a control process where fewer user interactions are needed to implement a best move by the game application 204 for a particular piece 906. For example, instead of a user selecting several empty cells to narrow down the different moves a user can make for a given piece 906, the game application 204 can determine a best piece for a given empty cell 908 selected by the user. The control process first determines outcomes and/or candidates associated with all possible piece positions and orientations for a given geometric shape. The control process then selects the best outcome and/or candidate from the set of all possible outcomes and/or candidates. The move associated with the best outcome is selected as the best move and implemented on the user's behalf. This way, the difficulty of the game is decreased, making the exemplary game 204 more suitable to be played on a system 200 using a pointing-device as its input device.

FIGS. 10A-11C show more exemplary screen shots 1000, 1002, 1004, 1006, 1008, 1010, 1012, 1014, 1100, 1102, and 1104 of the mouse-controlled puzzle game 204 for illustrating more input control processes associated with the mouse-controlled game 204. The implementation illustrated in FIG. 10 incorporates the above-mentioned input control processes as well as an additional input control process which, as described in relation to FIG. 2, is associated with assisting a user during the playing of the exemplary game 204 by determining, for the user, best outcomes for a particular geometric shape. As shown in these illustrative figures, the game application 204 determines the best outcomes and/or candidates 1012 and 1014 and, if a user selects any of the cells such as cell 1016 corresponding to a pre-determined best outcomes 1012, the game application 204 automatically places the desirable piece 1018 for the user to fill the remaining cells as shown in FIG. 10C. This input control process is advantageous for beginners who are trying to familiarize themselves with the game 204 and see how the game 204 may be played out according to processor-determined best moves, or strategies. The processor may use an algorithm based on, for example, artificial intelligence (AI) to determine the best moves. This provides beginners with a learning opportunity about how to best play the game 204 and is more suitable for a user playing with a pointing device, such as a touch screen and/or mouse as described more in detail below.

Figures 10A, 10B:
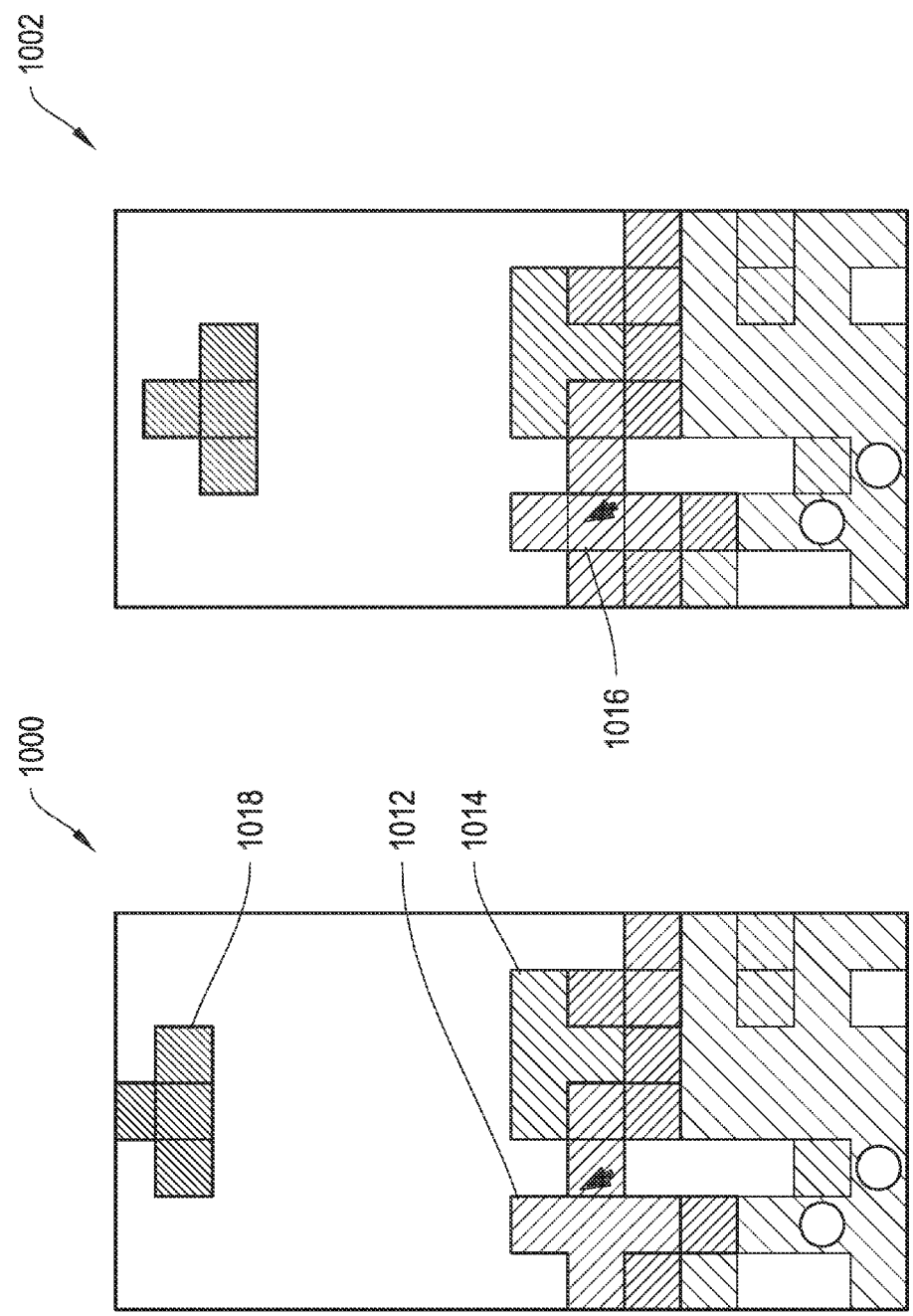
Figure 10D:
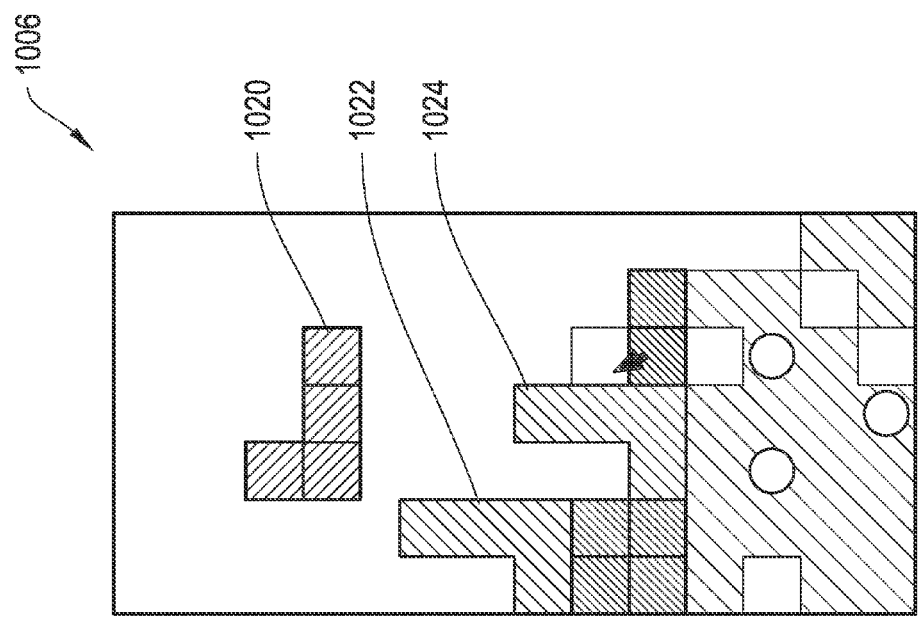
Figure 10C:
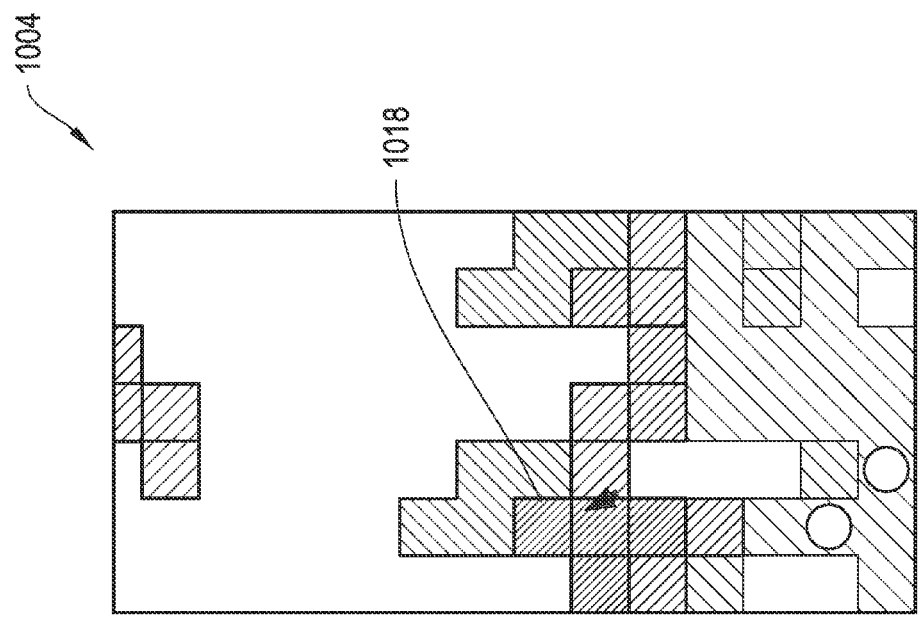
Figure 10F:
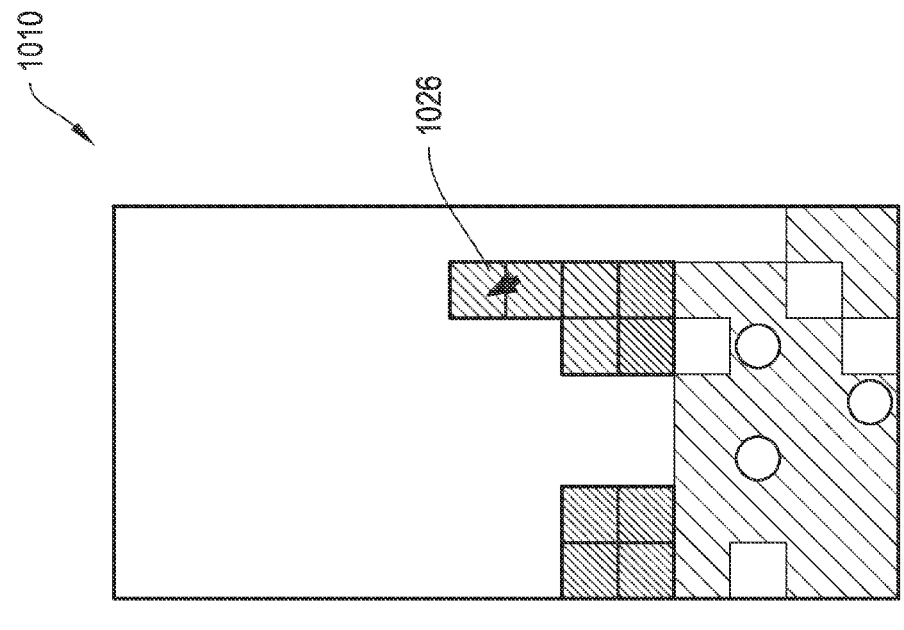
Figure 10E:
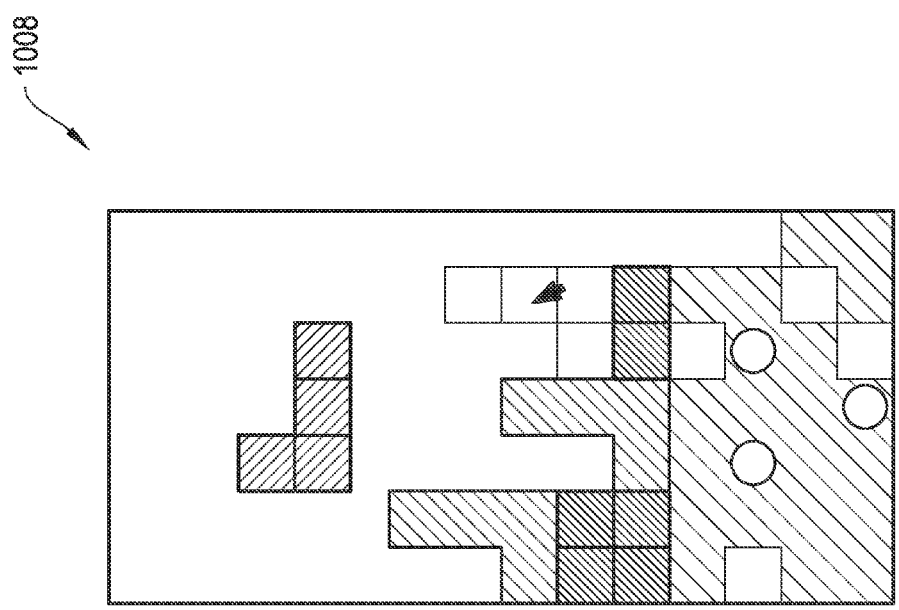

FIGS. 10D-E illustrate how a user can select a destination position and orientation 1026 for a piece and/or object 1020 that is not one of the selected best destination positions 1022 and 1024. Like FIGS. 10D-E, FIGS. 11A-C determine the best move for a given puzzle piece for any empty cell selected by the user. As described in relation to FIG. 9, a user can select a would-be-filled cell to implement the best move determined by the game application 204 for that the selected cell. However, according to the input control process illustrated in FIG. 11, a user can select a cell 1106 other than a would-be-filled cell if a pre-determined best move were executed. In these instances, the game application 204 can nevertheless determine the best destination position and orientation 1110 for a piece 1108 for the selected cell 1106 according to the various processes described above. For example, after considering the best outcomes determined by the game application 204, the user may prefer filling an empty cell 1106 that is not a would-be-filled cell corresponding to a best move for a given piece determined by the application 204. This gives the user the flexibility and the ultimate control to choose a destination position and orientation of a piece 1108. This is particularly useful because users often have a more holistic strategy or approach toward playing a puzzle game. For example, a user may consider an incoming piece as well as a current piece to better determine an overall strategy for the game. That is, since a user can typically look-ahead at the next piece, the user should be given the ultimate control over how the game should be played. Accordingly, the game control process is built in with the ability to allow a user not to follow a best move determined for the user.

Figure 12A:
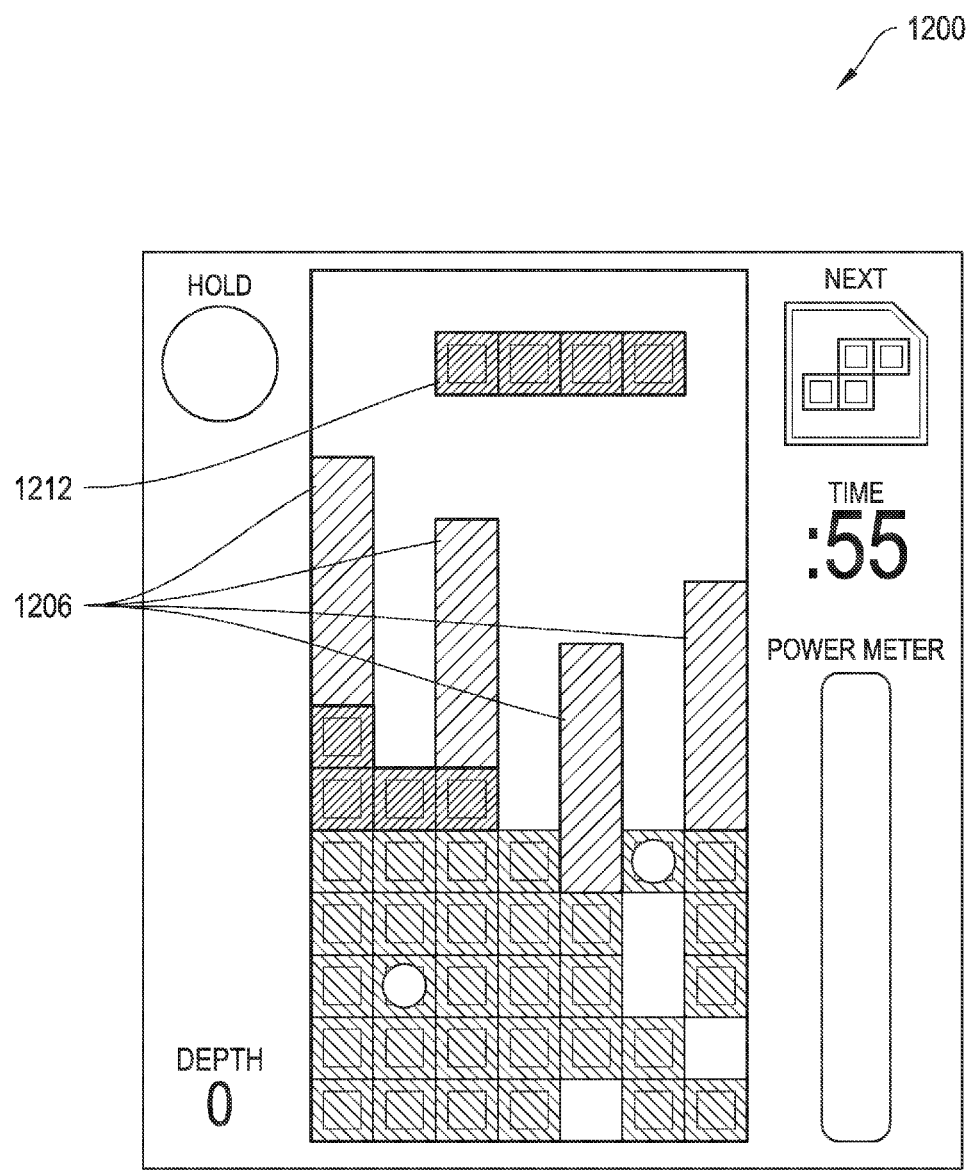
FIG. 12A-C includes a set of exemplary screen shots showing the process of cycling through a first set of best position and destination candidates, then a second set of best position and destination candidates, and then a third set of best position and destination candidates.
Figure 12B:
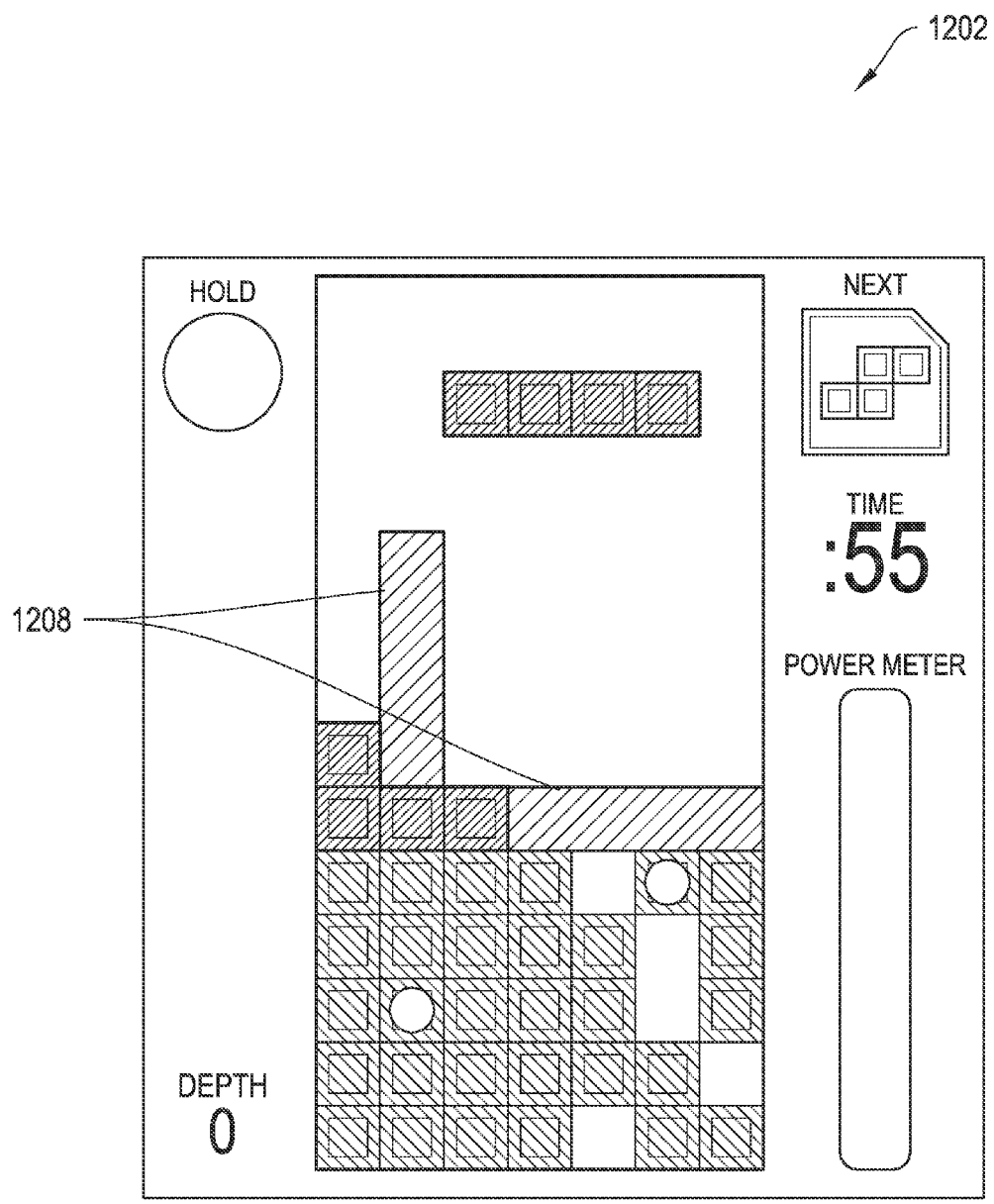
Figure 12C:
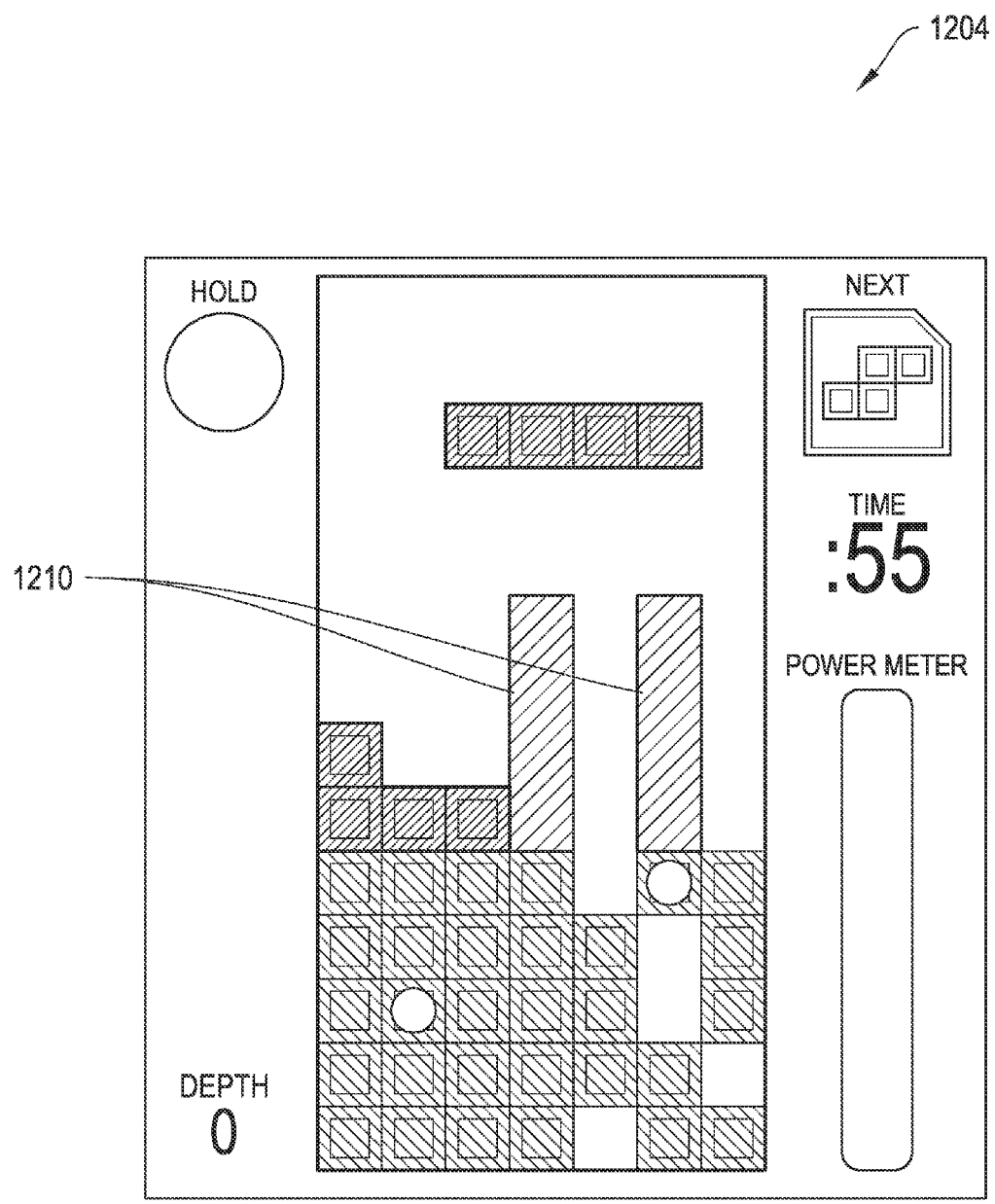

FIG. 12A-C includes a set of exemplary screen shots 1200, 1202, and 1204 showing the process of cycling through a first set of best position and destination candidates 1206, then a second set of best position and destination candidates 1208, and then a third set of best position and destination candidates 1210. In certain configurations, the user may select a cycle button included on the display 1212 and/or select a portion of the display, for example, by clicking on a certain area of the display to initiate cycling of the best position and destination candidates.

Figure 13:
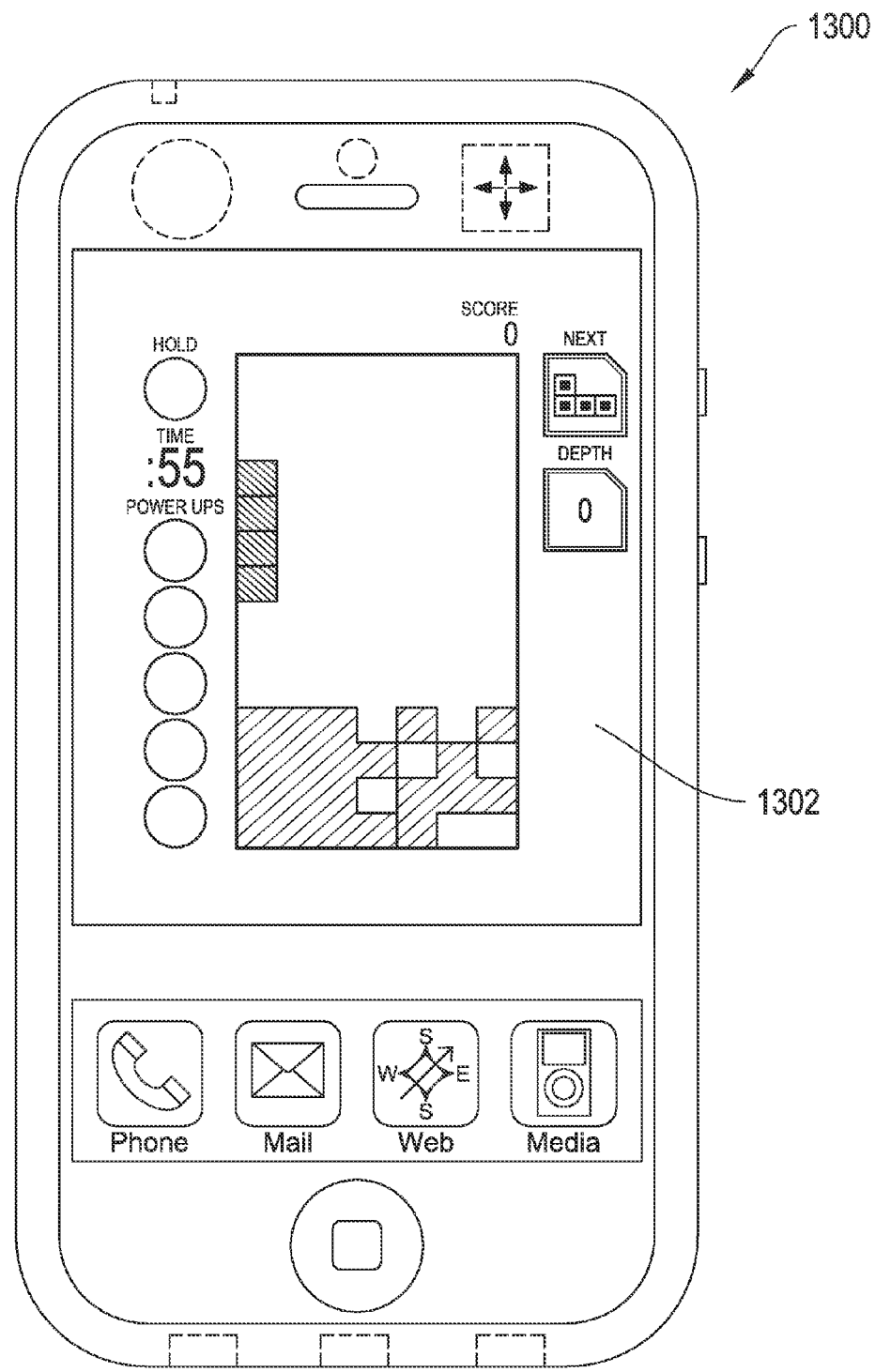
FIG. 13 is a diagram of a portable electronic device and/or mobile device for executing a mouse-controlled puzzle game application.

FIG. 13 is an exemplary diagram of a portable electronic device and/or mobile device 1300 for executing a mouse-controlled puzzle game application 204. As shown, the mobile device 1300 can launch (and operate under the control of) one or more applications in response to a user selecting an icon associated with an application. As depicted, the mobile device has several primary applications including a phone application, an email program, a web browser application, and a media player application. Those skilled in the art will recognize that a mobile device 1300 may have a number of additional icons and applications, and that applications may be launched in other manners as well. In the configuration shown, the mouse-controlled puzzle game application 204 is launched by the user tapping and/or touching an icon displayed on the touch screen interface of the mobile device 1300.

Once the exemplary mouse-controlled puzzle game application 204 is launched, the user may interact with the mouse-controlled puzzle game application 204 according to the various methods described above. In some instances, the program instructions associated with the game application 204 are modified to make it suitable for the mobile device 1300. In other implementations, an additional plug-in may be required for implementing a portable and/or mobile version of the mouse-controlled application 204. To do so, in one configuration, touch-screen inputs may be converted to corresponding mouse-controlled inputs. For example, a user tapping on the touch-screen 1302 may be converted by the plug-in application into a user clicking a mouse. Similar to moving a cursor across a screen by moving a mouse, a user can direct the movement of a puzzle piece by sliding a finger or stylus across the touch-screen 1302. A user can further release a tap, similar to releasing a click, by removing the finger or stylus from the touch-screen. This way, a user can benefit from the various input control processes mentioned above associated with the mouse-controlled puzzle game 204 on a mobile device 1300 without the need for a mouse or keyboard.

Figure 14:
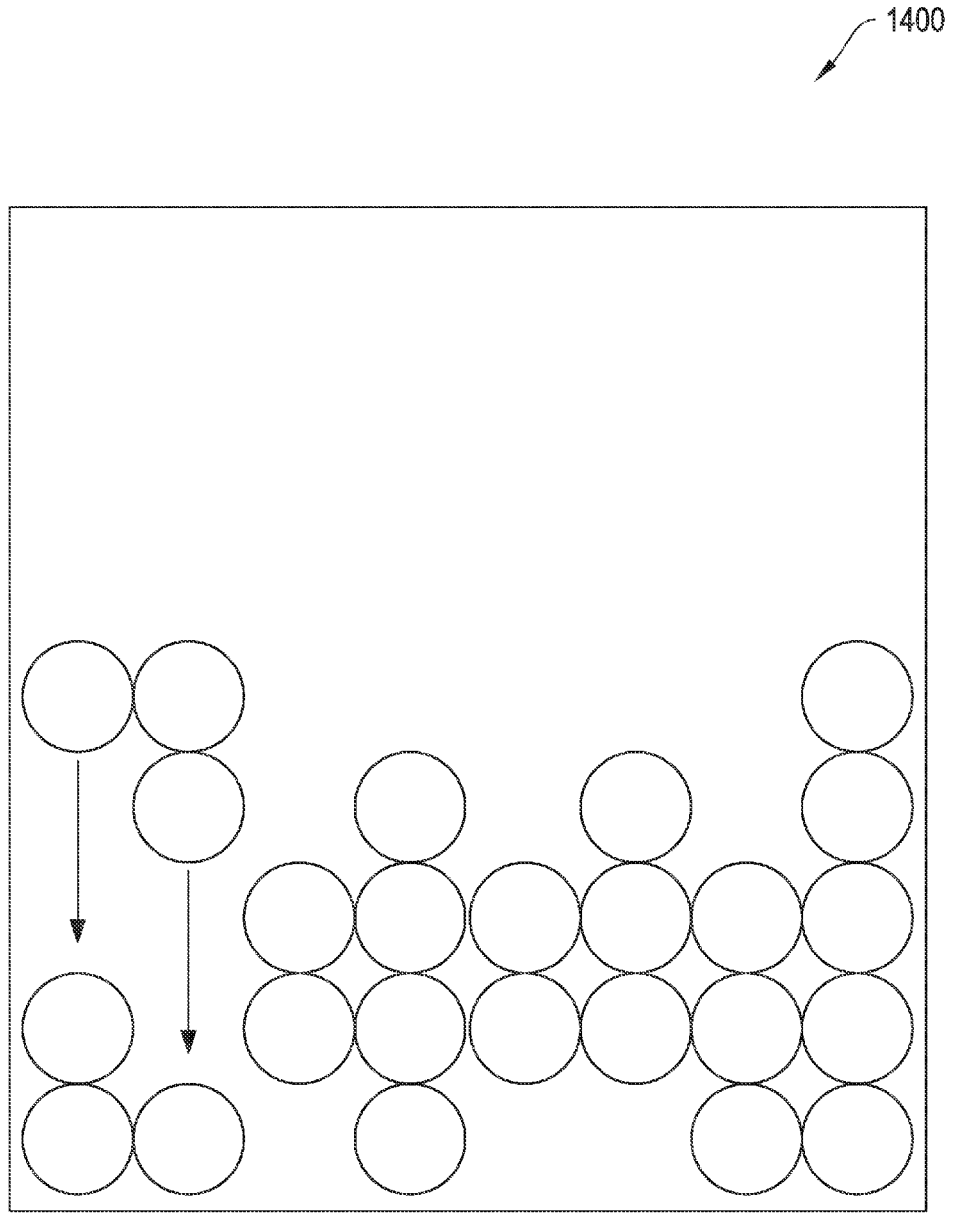
FIG. 14 is a diagram depicting the exemplary puzzle game.

FIG. 14 is a diagram of a display 1400 depicting the exemplary puzzle game 204 according to another configuration. In some instances, as shown in FIG. 14, the exemplary puzzle pieces 1402 and the base 1404 are composed of circular-shaped objects as opposed to squares. A corner piece 1406 composed of three circular cells is shown falling toward the base 1404. A user can manipulate the falling corner piece 1406 using the above-mentioned processes or methods.

As mentioned above, the exemplary process of manipulating pieces and/or objects used in a puzzle game 204 depicted in FIGS. 4-14 may be applied to a wide variety of technical applications such as, without limitation, computer-aided design, packaging systems, learning systems, and so on. The disclosed systems and methods allow a user to control a variety of different types of objects using a pointing input device as an input device. For example, the disclosed systems and methods can enable a piece and/or object of any shape to appear from any side or even corner of a display region. Similarly, a display field and/or region may have various shapes other than the rectangle shape shown in FIGS. 4-14. For example, the display and/or field region may have a circular shape, an oval shape, a triangular shape, and/or any other geometric shapes. In some implementations, the applications of the disclosed systems and methods are configured to allow a user to customize a shape for a piece or a display region. The object manipulation application can create a user profile for storing these user-specified settings. A user can further alter the workflow of an application, such as a puzzle game, defined by the game application. In some implementations, a user can rotate a piece by clicking on the piece and circularly moving a mouse on a surface. Similarly, a user of a touch screen input device can rotate a piece by centering on a point of the piece and moving a finger on the screen in a circular motion.

Figure 15:
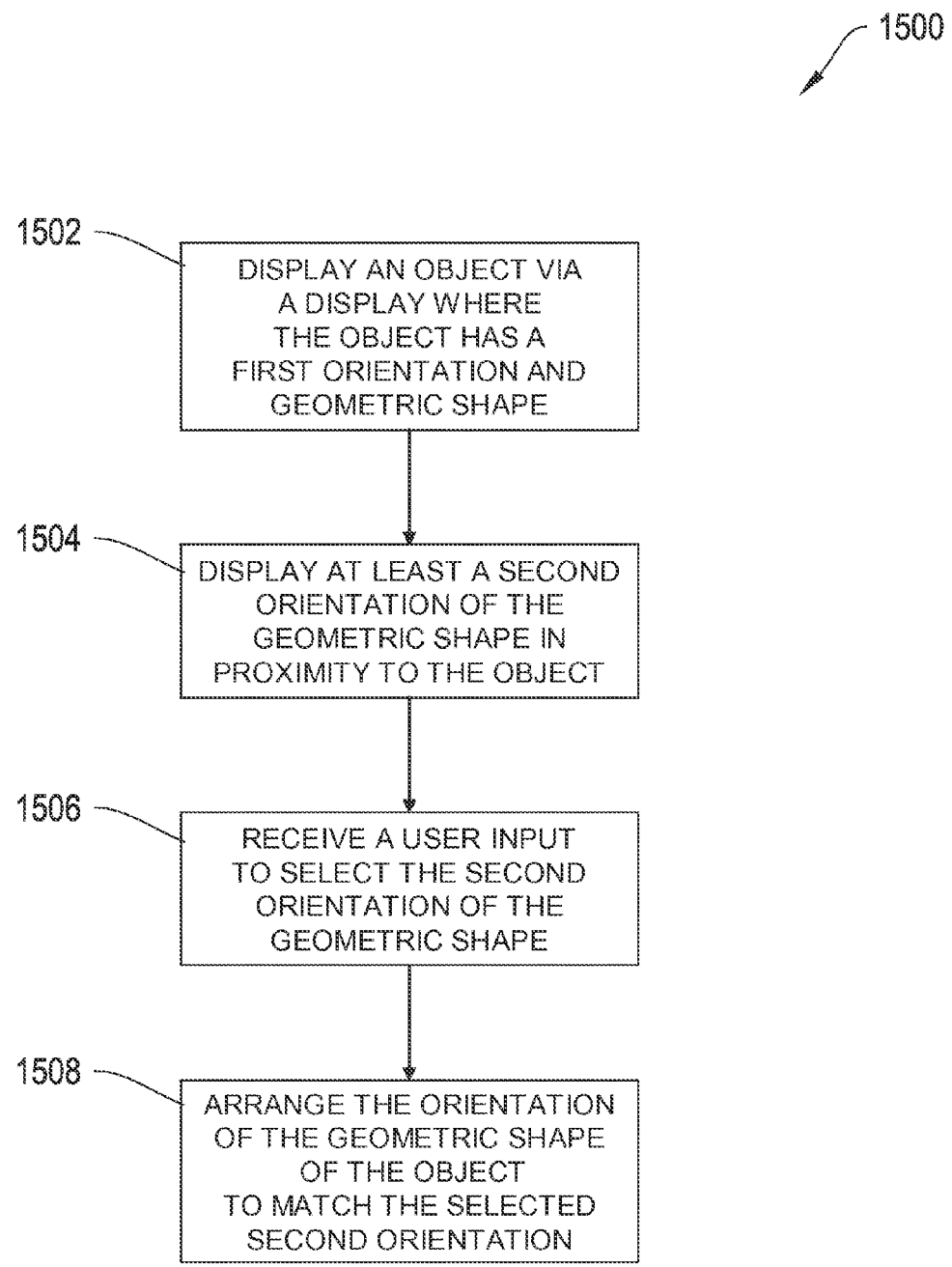
FIG. 15 is an exemplary flow diagram of a process for manipulating objects.

FIG. 15 is an exemplary flow diagram of a process 1500 for manipulating objects. In certain implementations, a system such as system 200 and/or device 1300 includes a processor such as CPU 302 for running a game application 204. The processor 302 may access and/or use a non-transitory computer readable medium having program codes that cause the processor 302 to perform certain functions, applications, and/or routines including displaying an object 508 via a display 316 (Step 1502). The object 508 may have a particular geometric shape and be arranged in first orientation of the geometric shape. The processor 302 may determine one or more orientations 510, 512, and 514 of the object 508. The processor 302 may determine the one or more orientations 510, 512, and 514 based on the possible ways in which the object 508 can be oriented at a destination position and orientation. For example, in FIG. 5A, the object 508 must be positioned such that each mino fit in a cell associated with a destination position and orientation. Thus, the processor 302 is able to determine a limited number of possible orientations 510, 512, and 514 (including the current orientation of object 508).

For other objects, such as a three-dimensional object, the number of possible orientations may be extensive. In a situation where there is a large number of determined possible orientations, the processor 302 may provide a portion of the possible orientations for display, but allow the user to select additional portions. The processor 302 may display at least a second orientation 514 of the geometric shape in proximity to the object 508 (Step 1504). The system 200 and/or device 1300 may include a user interface and/or user input device 314 that receives a user input to select the second orientation 514 of the geometric shape of the object 508 to match the selected second orientation 514 (Step 1506). The processor and/or CPU 302, in communication with the display 316 and/or interface 314, may then arrange the orientation of the geometric shape of the object 508 to match the selected second orientation 514 (Step 1508).

In certain configurations, the application 204 sets a time limit for manipulating the object 508 from when the object 508 is first displayed. The application 204 may autonomously move the object 508 form a first position toward a second position on the display 314 at a rate of movement. The time limit may be based on the rate of movement of the object 508 and the second position on the display 314, 410, and/or 518. The geometric shape may be two-dimensional or three-dimensional. The geometric shape may include a trimino, tetromino, pentomino, polyomino, and/or another shape. The geometric shape may include a polygon, triangle, quadrilateral, square, pentagon, hexagon, ellipse, circle, an irregular shape, and/or a two-dimensional shape corresponding to a physical item. The geometric shape may include a polyhedron, sphere, spheroid, pyramid, cylinder, cone, prism, toroid, helix, dodecahedron, an irregularly shaped three-dimensional shape, and/or a three-dimensional shape corresponding to a physical item. In some instances, a tetromino may be referred to as a tetrimino or tetramino.

In certain implementations, the application 204, via display 518, displays all possible orientations of the geometric shape including orientations 510, 512, and 514 in proximity to the object 508. The user input may be via at least one of a pointer device, touch screen, audio input, and eye tracker using, for example, user interface and/or input device 314. In some configurations, a touch screen can function as a traditional pointing device such as touch screens for Windows® or MAC® OSX that provide a cursor that tracks a user's touch. However, in other configurations, a touch screen may be employed that, instead of providing a cursor that tracks a user's touch, enables a user to directly manipulate objects and/or other functions via the user's touch on a touch screen. The systems, devices, and methods herein support both types of touch screen. Furthermore, the systems, devices, and methods may support a multiple-choice type of play style, where other methods of input may include: camera-based eye/gaze tracking, EEG-based thought control, camera-based body movement and gesture tracking, buttons to directly select one of the multiple choices (such as, without limitation, an arcade machine or game show buzzer), or microphone-based voice command.

Based on the user input device 314, the processor and/or CPU 302 may use the user input to change the position of the object 508. The change in position may include a change in at least one of a horizontal and vertical position on the display 316 and/or 518. The user input may include selecting the object 508 and dragging the object 508 to a desired position on the display 316 and/or 518. The object 508 may represent a physical item of substantially corresponding shape. Thus, as a result of arranging the orientation of the object 518, a system such as system 100 can correspondingly arrange the orientation of the physical item.

Figure 16:
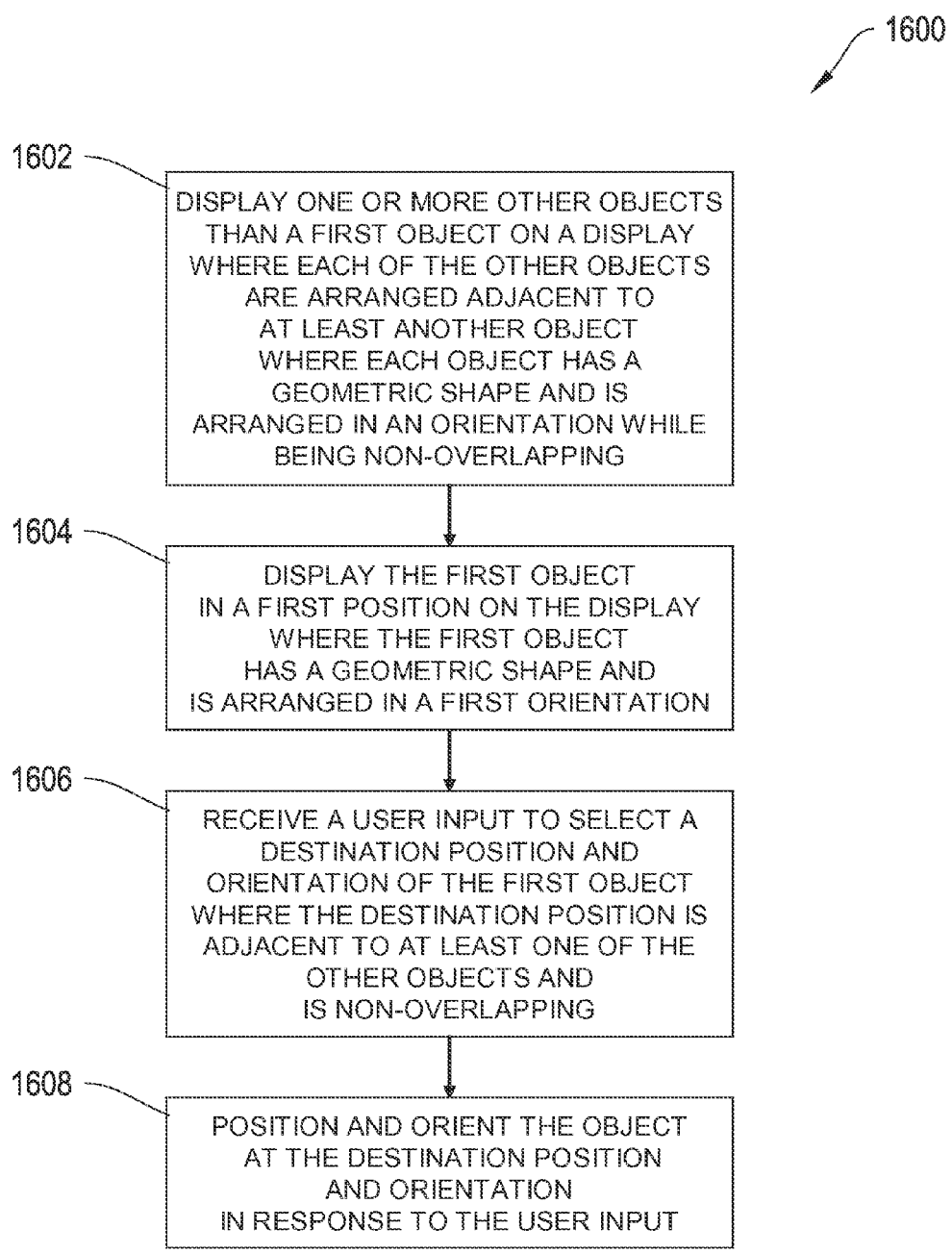
FIG. 16 is an exemplary flow diagram of another process for manipulating objects.
Figures 17A, 17B:
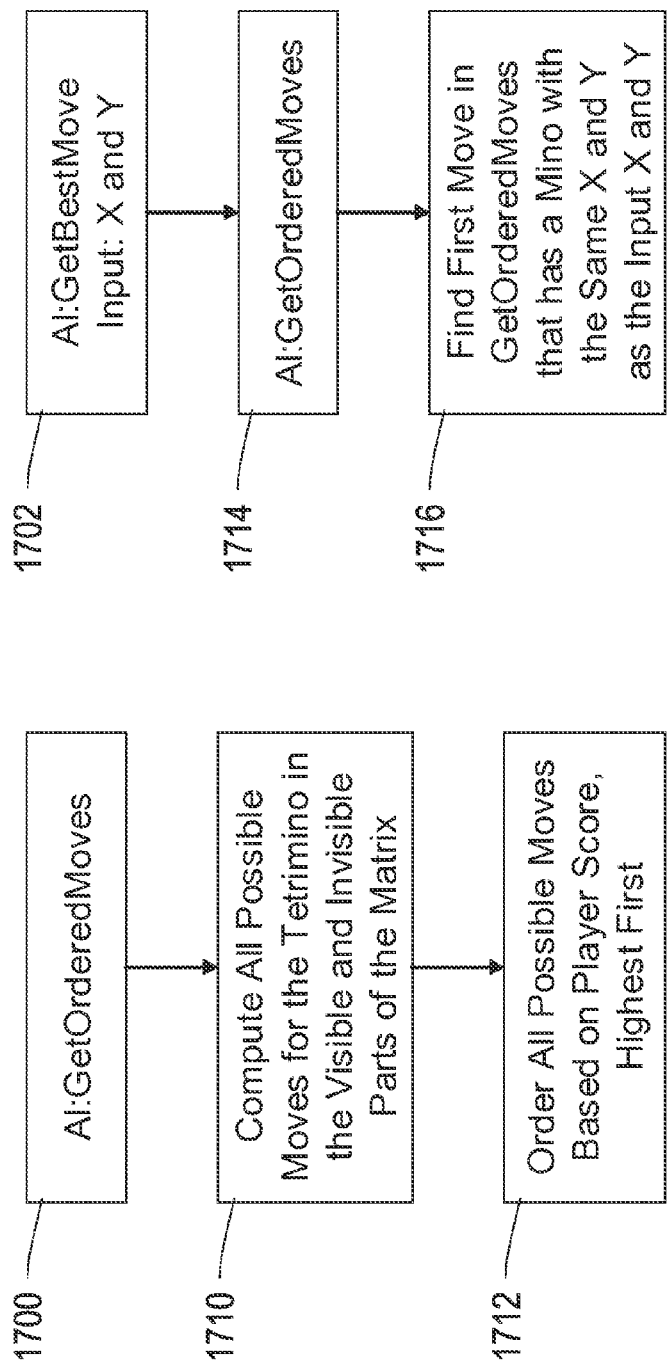
FIGS. 17A-21C include various exemplary flow diagrams illustrating various processes run by, for example, a processor associated with a pointer-based object control application
Figures 17C, 17D, 17E:
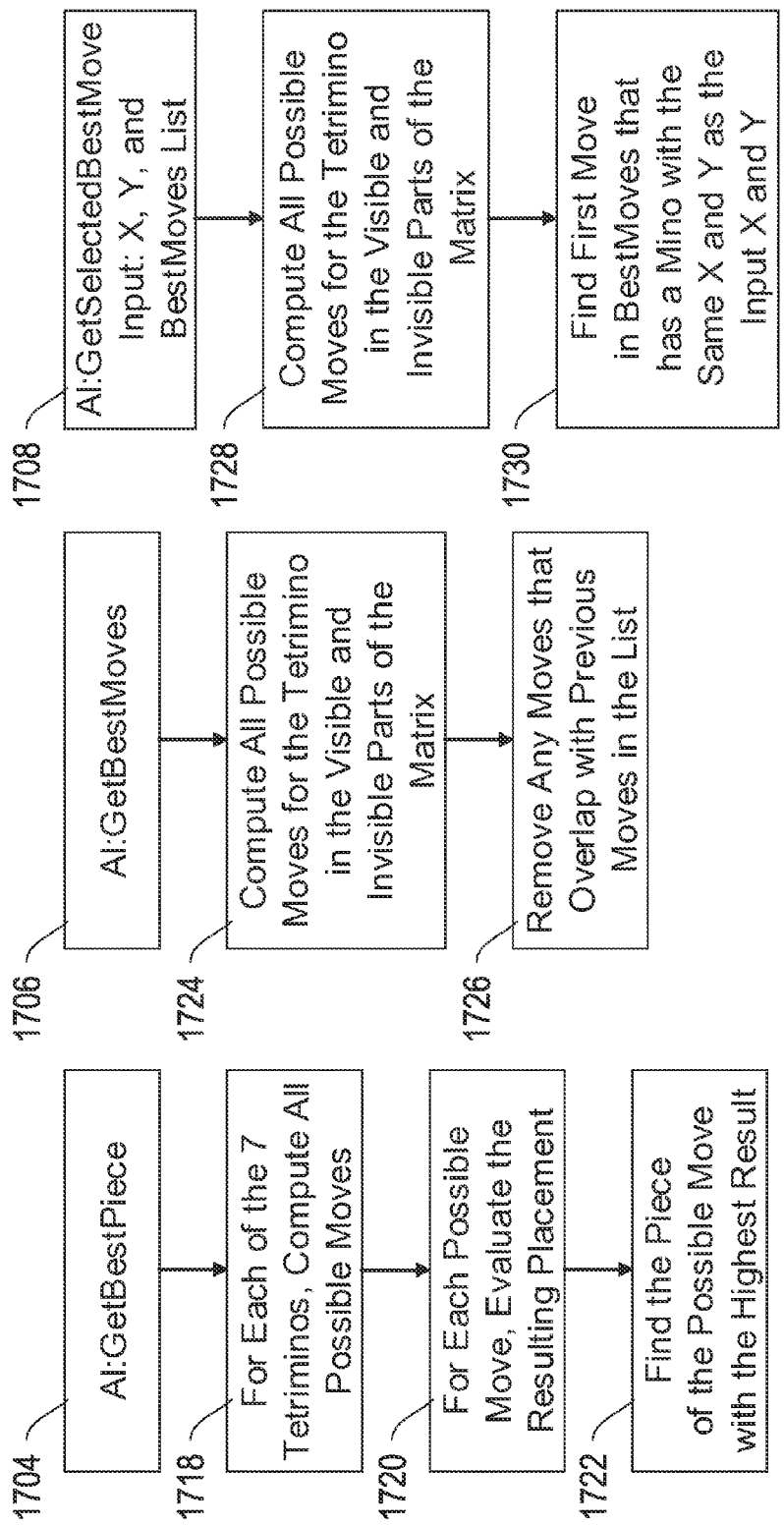

FIG. 16 is an exemplary flow diagram of another process 1600 for manipulating objects. A system such as system 200 may be used to manipulate a first object 712, 808, 906, 1018, 1108, and/or 1212 in relation to one or more other objects 818. The system 200 may include a computer 300 that uses a computer readable medium, operatively coupled to the computer 300. The computer readable medium may store program codes causing the computer 300 to perform functions, applications, and/or subroutines that display the one or more other objects 818 on a display 820 such that each of the other objects 818 is arranged adjacent to at least another object of the other objects. Each of the other objects 818 may have a geometric shape and be arranged in a particular orientation of a geometric shape. Each of the one or more other objects 818 may be arranged to be non-overlapping with respect to any other objects (Step 1602). The processor and/or CPU 302 may display the first object, e.g., object 808 in a first position on the display 820 where the first object 808 has a geometric shape and is arranged in a first orientation of its geometric shape (Step 1604). The processor and/or CPU 302 may receive a user input, via a user interface and/or user input device 314, to select a destination position and orientation of the first object 808, where the destination position is adjacent to at least one of the other one or more other objects 818 (Step 1604). The first object 808 may be non-overlapping with respect to any one of the other objects 818. In response to the user input, the processor and/or CPU 302 positions and orients the object 808 at the destination position and orientation 812. The destination position and orientation and/or destination position and orientation candidate may also be referred to as an outcome.

In another configuration, a portable electronic device 1300 includes an application and/or interfaces with an application 204 for manipulating a first object 712, 808, 906, 1018, 1108, and/or 1212 in relation to one or more other objects 818. The device 1200 may include a display 316 and/or 1302 arranged to display the one or more other objects 818 such that each of the other objects 818 is arranged adjacent to at least another object of the other objects, where each of the other objects 818 has a geometric shape and is arranged in an orientation of its geometric shape. Each of the one or more other objects 818 may be non-overlapping with respect to any other objects (Step 1602). The display 316 and/or 1302 may also display the first object 712, 808, 906, 1018, 1108, and/or 1212 in a first position on the display where the first object 818 has a geometric shape and is arranged in a first orientation of the geometric shape (Step 1604).

The device 1300 may include a user interface such as user input device 314 that is arranged to receive a user input to select a destination position and orientation of the first object 12, 808, 906, 1018, 1108, and/or 1212 where the destination position is adjacent to at least one of the other one or more other objects 818. The first object, e.g., object 808, may be non-overlapping with respect to any one of the other objects 710 and/or 818 (Step 1606). The set of other objects may also be referred to as the base. The processor and/or CPU 302, in communication with the display 316 and/or 1302 and the user interface and/or input device 314, is arranged to position and orient the object at the destination position and orientation in response to the user input (Step 1608).

The user input may include selecting a portion of the display 316 and/or 718 adjacent to the one or more other objects 710 on the display 316 and/or 718. The display 718 may then display one or more destination position and orientation candidates 714 that correspond to the selected portion of the display 718. The processor and/or CPU 302 may adjust the selected portion 708 and/or 716 of the display 718 to determine the destination position and orientation of the first object 712. The adjusting of the portion 708 and/or 716 may include highlighting one or more cells of the display 718 where the one or more cells including a shape of a mino of a polyomino. The user input via input device 314 may include clicking and holding a pointing device button such as the button on a mouse or a virtual button displayed on the display 718.

In certain implementations, the processor and/or CPU 302 determines the best destination position and orientation of an object such as object 712, 808, 906, 1018, 1108, and/or 1212 based on at least one of a selected portion 708 and/or 716 of the display 718, the geometric shape of the object 712, 808, 906, 1018, 1108, and/or 1212, the geometric shape of one or more subsequently available objects, one or more possible destination position and orientation candidates 714, 1012, 1014, 1022, 1024, 1206, 1208, and/or 1210, the height to width ratio of an object or the other objects, the number and position of any empty cells adjacent to the other objects, any gaps adjacent to the other objects, any empty cells or gaps subsequent to positioning and orienting the object.

The user input, via user interface and/or input device 314, may include selecting a portion of the display 316, 718, 820, 910, and so on. The selected potion 708 and/or 716 of the display includes one or more cells where each cell includes the shape of a mino of a polyomino. The destination position and orientation may correspond to the determined best destination position and orientation. The processor and/or CPU 302 may determine one or more best destination position and orientation candidates of the object based on at least one of a selected portion of the display, the geometric shape of the object, the geometric shape of one or more subsequently available objects, one or more possible destination position and orientation candidates, the height to width ratio of an object or the other objects, the number and position of any empty cells adjacent to the other objects, any gaps adjacent to the other objects, any empty cells or gaps subsequent to positioning and orienting the object.

The display 316 may display the one or more candidates 1012, 1014, 1022, 1024, 1206, 1208, and/or 1210 in a format other than the format for the first object 712, 808, 906, 1018, 1108, and/or 1212 and the one or more other objects 710 and/or 818. The format may include at least one of a color, shading, transparency, texture, and patterning. The user input, via interface and/or input device 314 may include selecting a portion of one of the best destination position and orientation candidates. The one or more candidates may include a first set 1206 of best destination position and orientation candidates. The display 316 may display a second set 1208 and/or 1210 of best destination position and orientation candidates instead of the first set 1206 of candidates in response to a second user input. The second user input includes selecting a button on the display 316. The best destination position and orientation candidates 1206, 1208, and/or 1210 may not overlap and/or may not be adjacent to each other.

The processor and/or CPU 302 may determine an order or rank of the candidates such that the first set 1206 of candidates includes candidates having a higher order or rank than candidates of the second set 1208 and/or 1210. The processor and/or CPU 302 may set a time limit for manipulating the object from when an object is first displayed. The processor and/or CPU 302 may interface with the display 316 to affect movement of an object from a first position toward a second position on the display at a rate of movement. The time limit may be based on the rate of movement of the object and/or the second position on the display. The geometric shape may be two-dimensional or three-dimensional. The geometric shape may include a trimino, tetromino, pentomino, polyonmino, and/or another shape. The geometric shape may include a polygon, triangle, quadrilateral, square, pentagon, hexagon, ellipse, circle, an irregular shape, and/or a two-dimensional shape corresponding to a physical item. The geometric shape may include a polyhedron, sphere, spheroid, pyramid, cylinder, cone, prism, toroid, helix, dodecahedron, an irregularly shaped three-dimensional shape, and/or a three-dimensional shape corresponding to a physical item.

FIGS. 17A-21C include various exemplary flow diagrams illustrating various processes run by, for example, the processor and/or CPU 302 associated with a pointer-based object control application such as application 204. The processor and/or CPU 302 may use an artificial intelligence (AI) application to determine various features, object moves, and/or destination position locations and orientations based on the various processes 1700, 1702, 1704, 1706, 1708, 1800, 1900, 2000, and 2100. Processes 1700, 1702, 1704, 1706, 1708, 1800, 1900, 2000, and 2100 include various processes associated with AI calls used for evaluating an object's placement on a display 316. The AI processes may be included as part of processes 220, 222, 224, and/or 226 of FIG. 2 to not only determine where to place an object and/or piece, but also to determine the path and manipulations required to get the piece and/or object there. Thus, the various AI processes 1700, 1702, 1704, 1706, 1708, 1800, 1900, 2000, and 2100 relieve the task for a user of the intricate manipulations of a piece and/or object, which is cumbersome to achieve with a mouse and/or touch device.

Process 1700 includes steps 1710 and 1712 to get ordered moves. Process 1702 includes steps 1714 and 1716 to get a best move based on input coordinates which may be associated with the position of a mouse cursor. Process 1704 includes steps 1718, 1720, and 1722 to get best objects and/or pieces. Process 1706 includes steps 1724 and 1726 to get best moves without overlap. Process 1708 includes steps 1728 and 1730 to get best moves based on input coordinates.

Figure 18A:
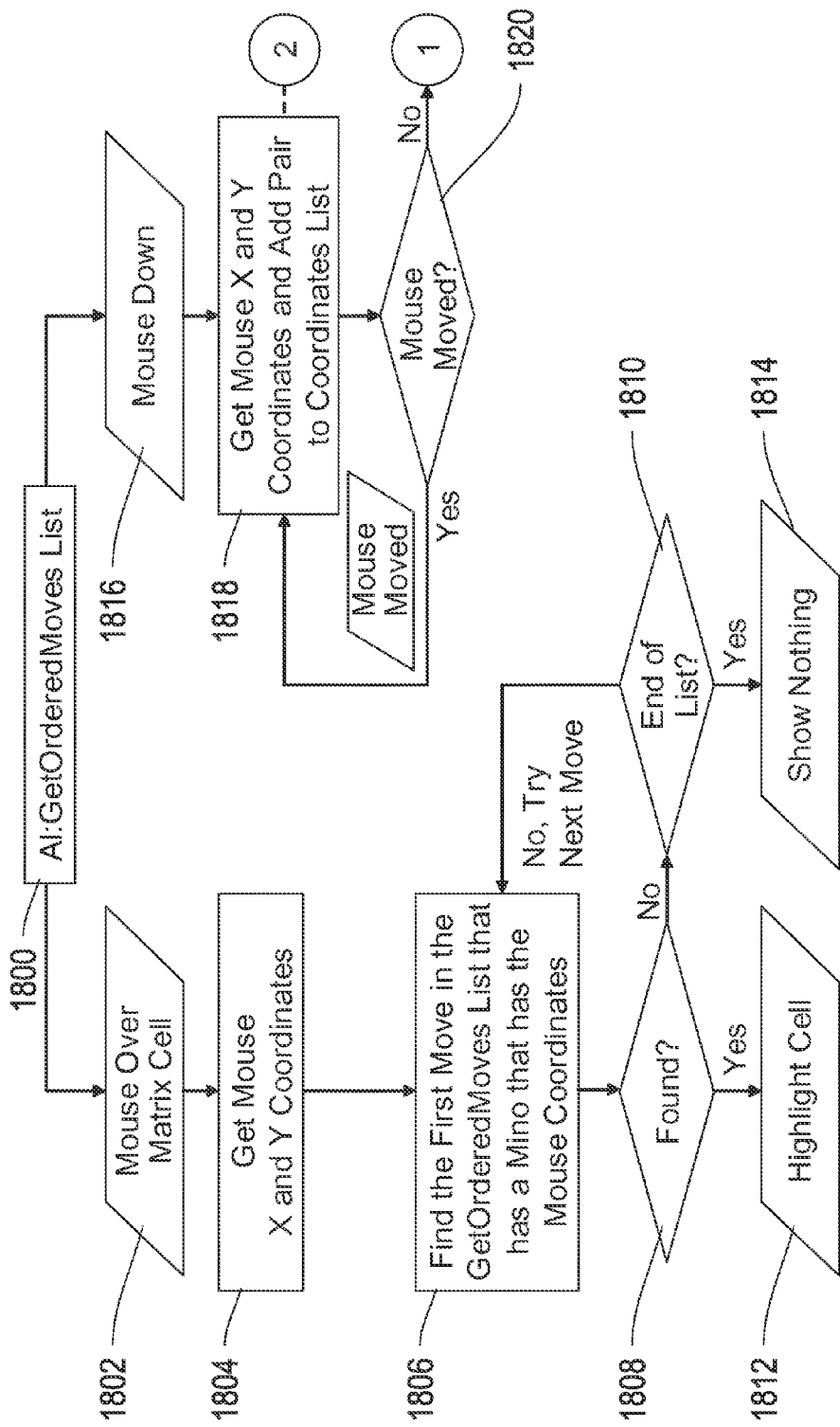
Figure 18B:
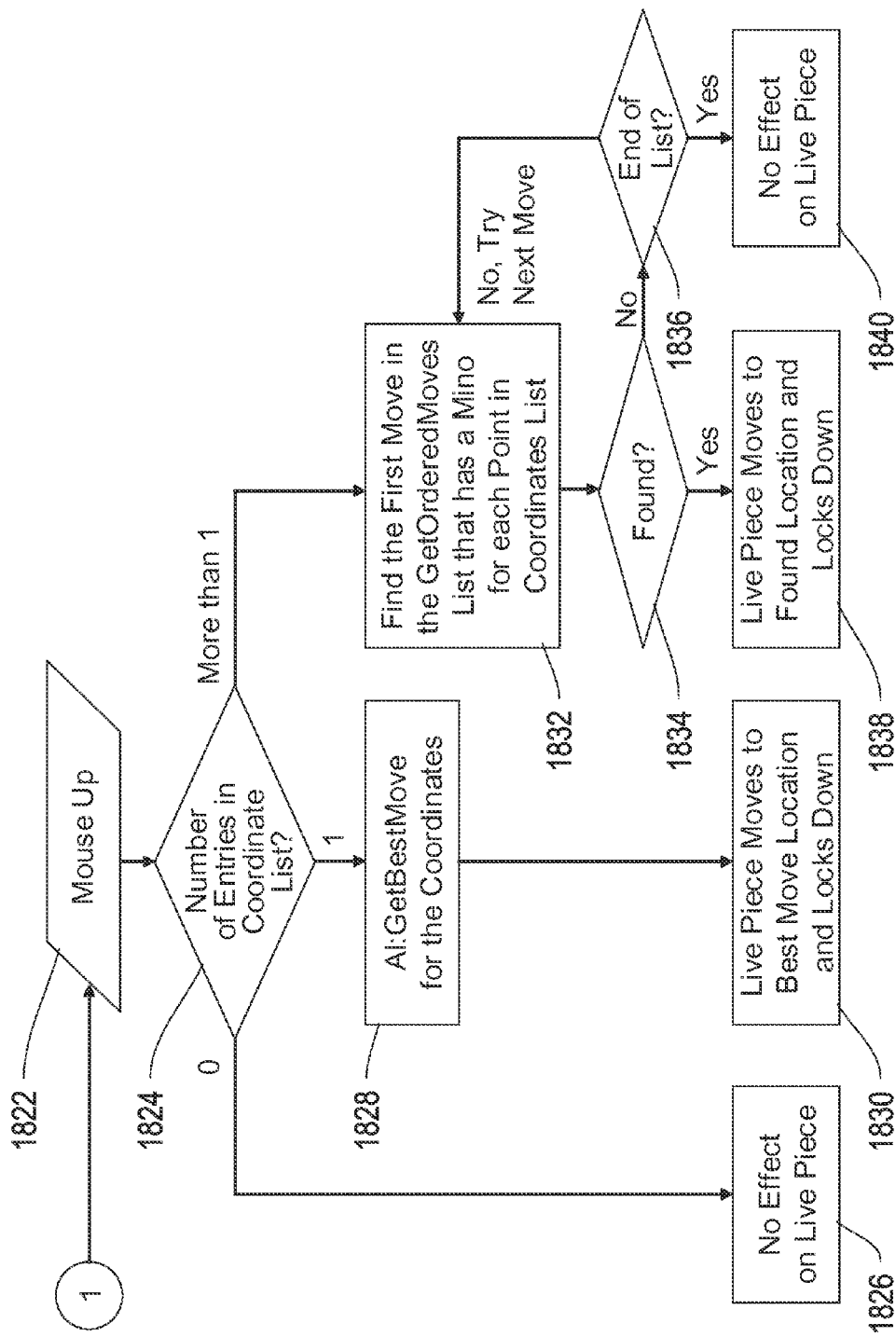
Figure 18C:
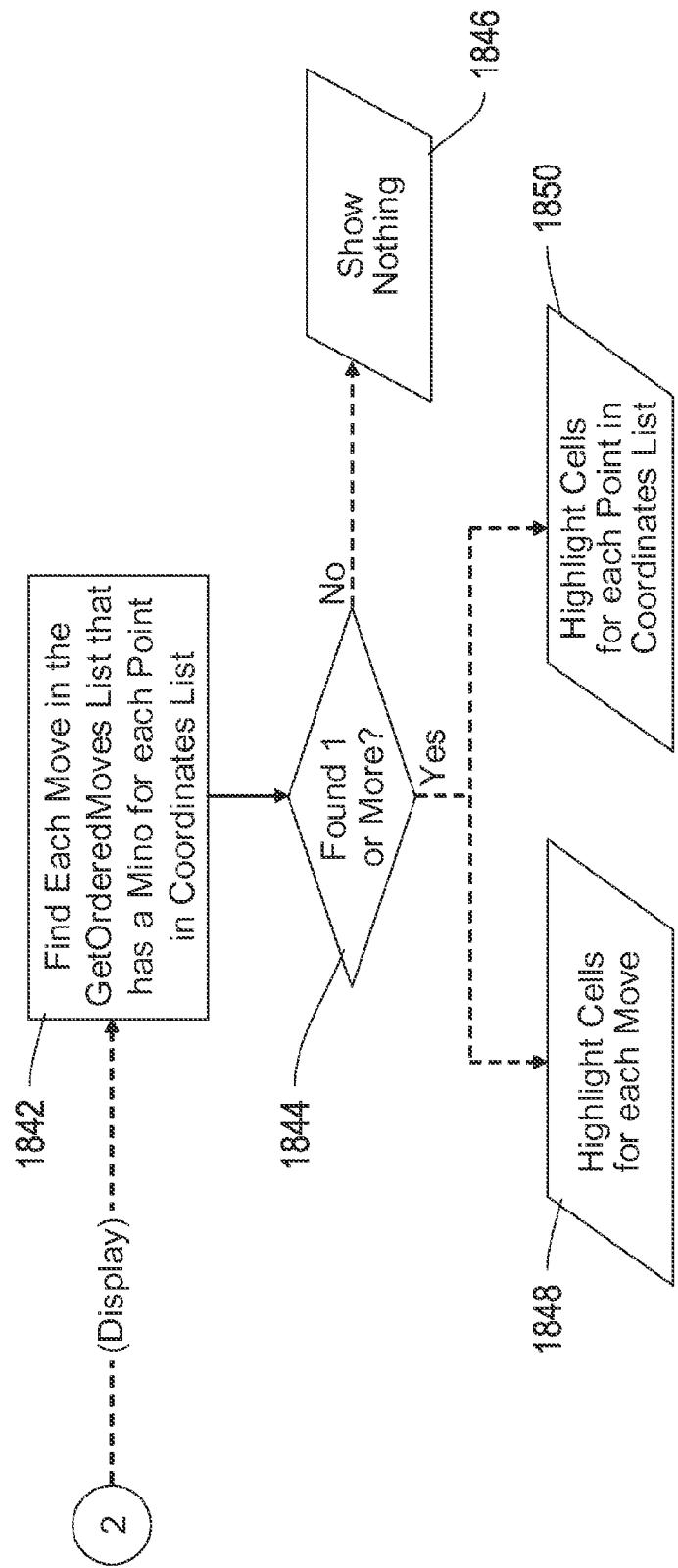
Figure 19A:
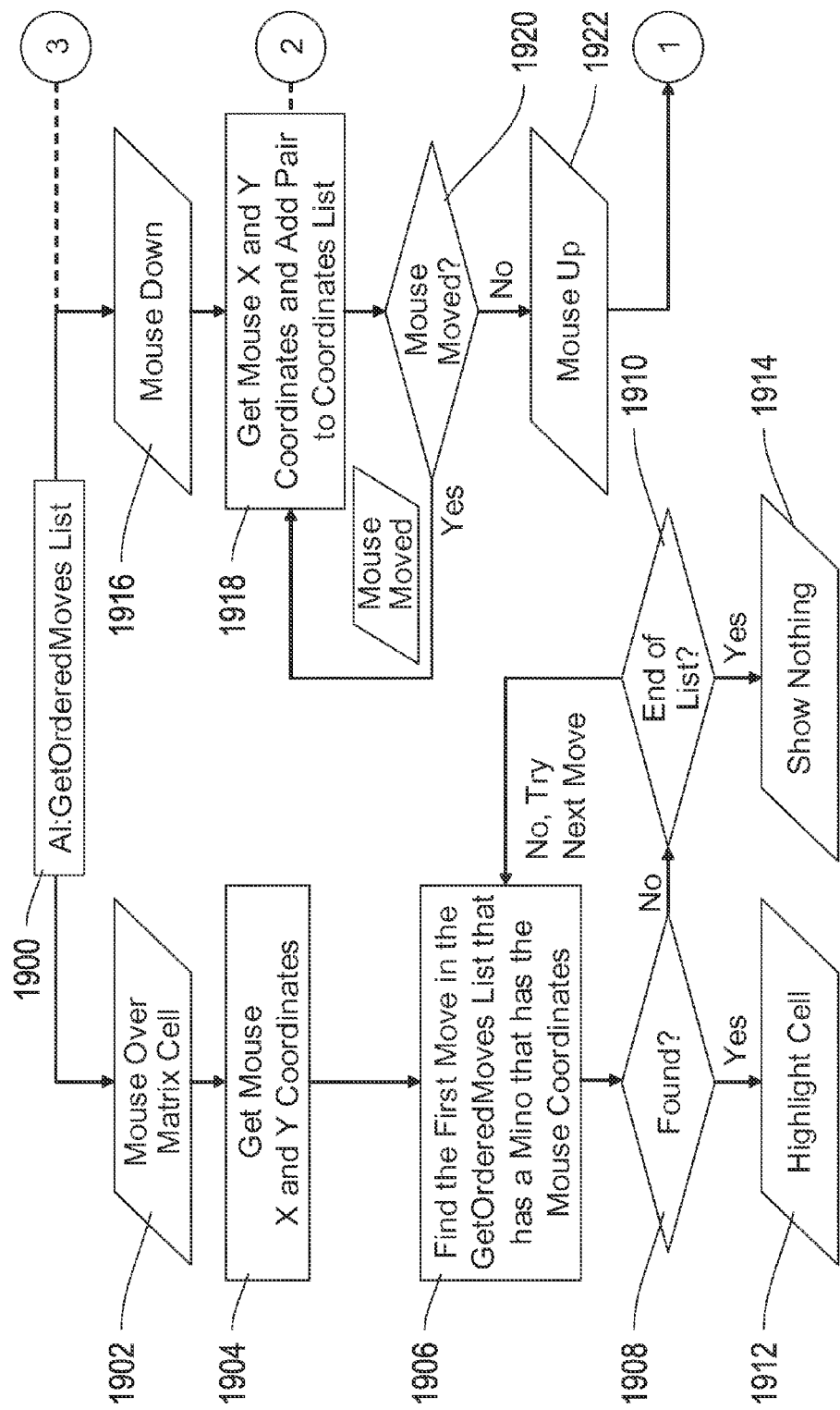
Figure 19B:
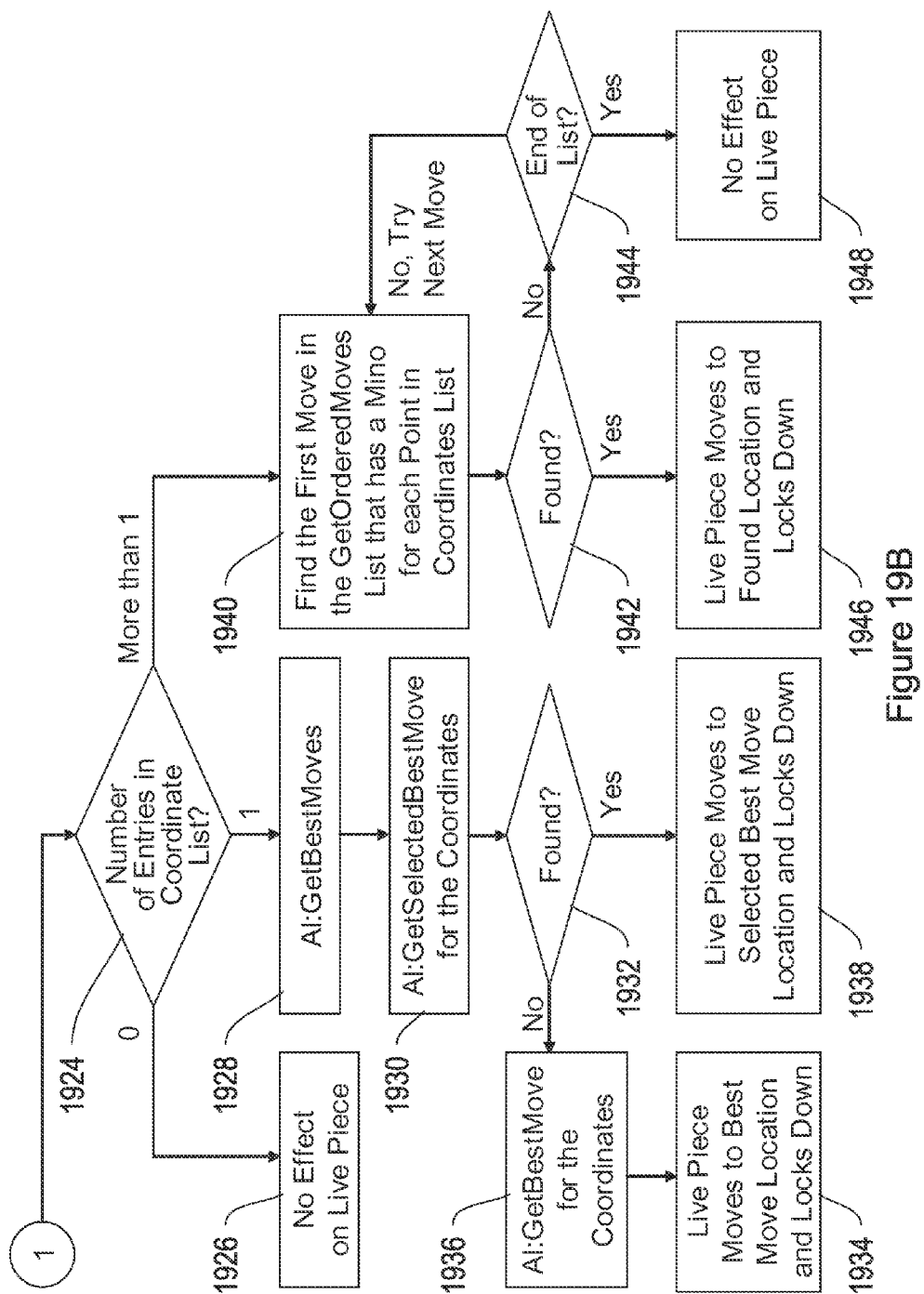
Figure 19C:
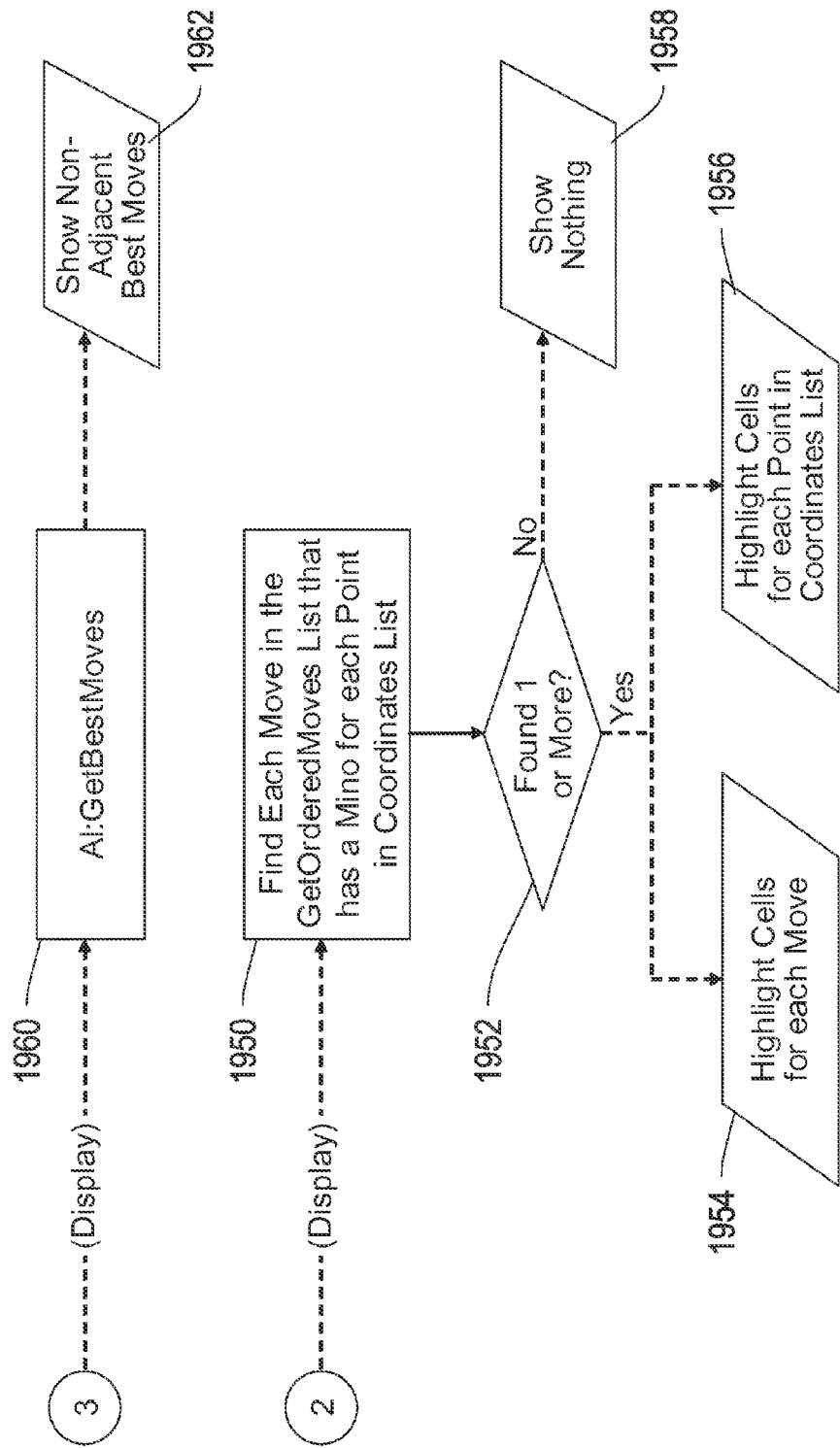
Figure 20A:
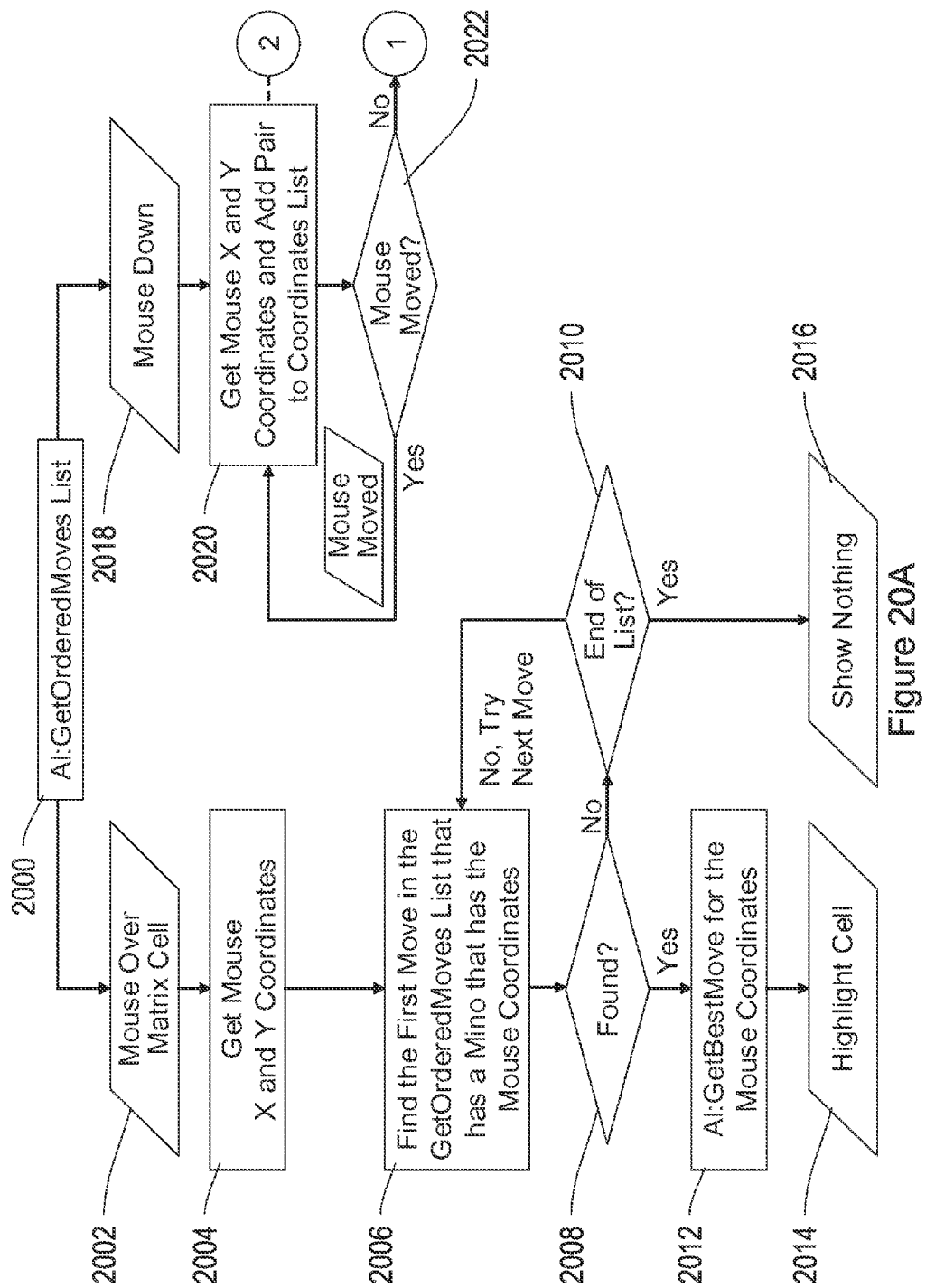
Figure 20B:
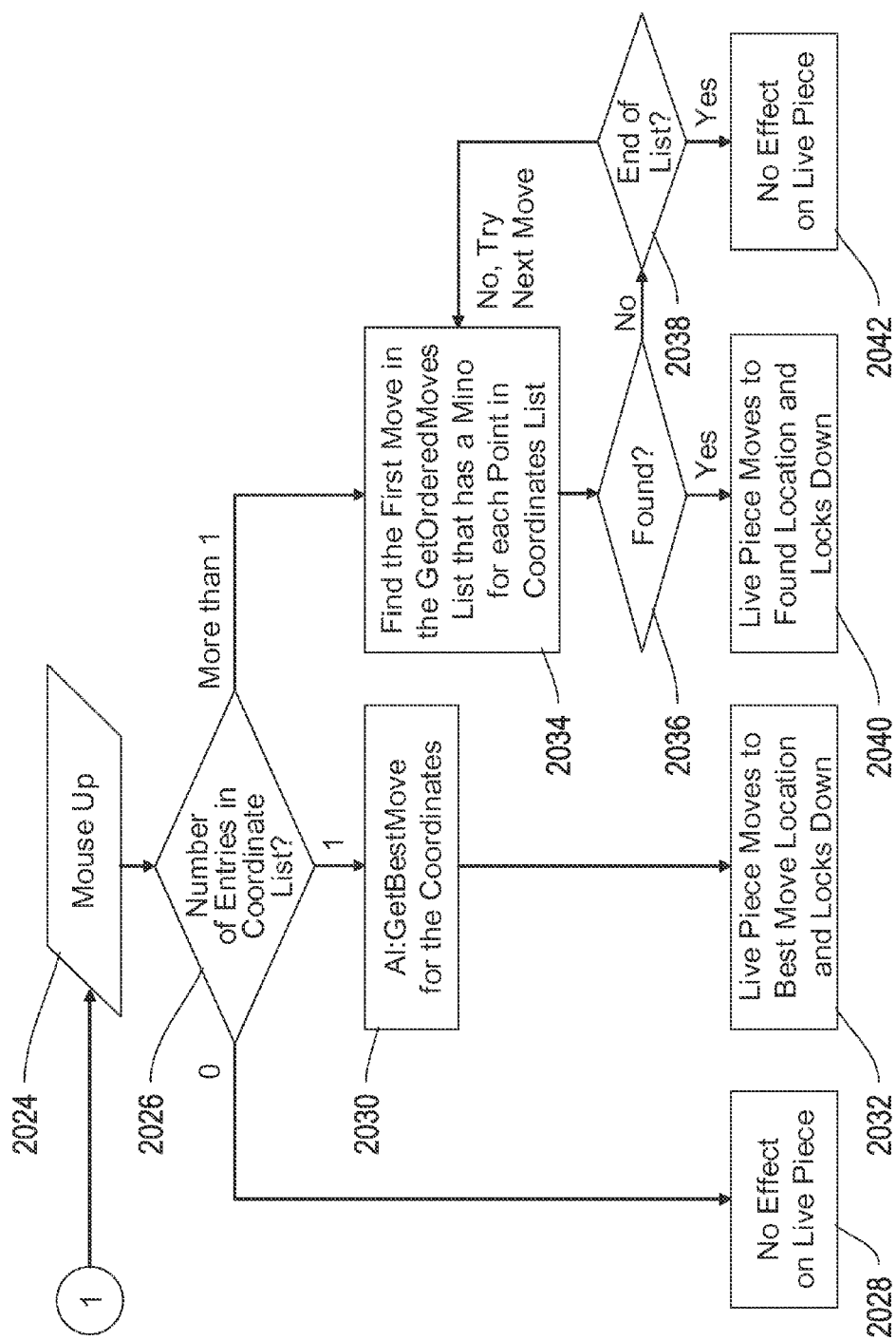
Figure 20C:
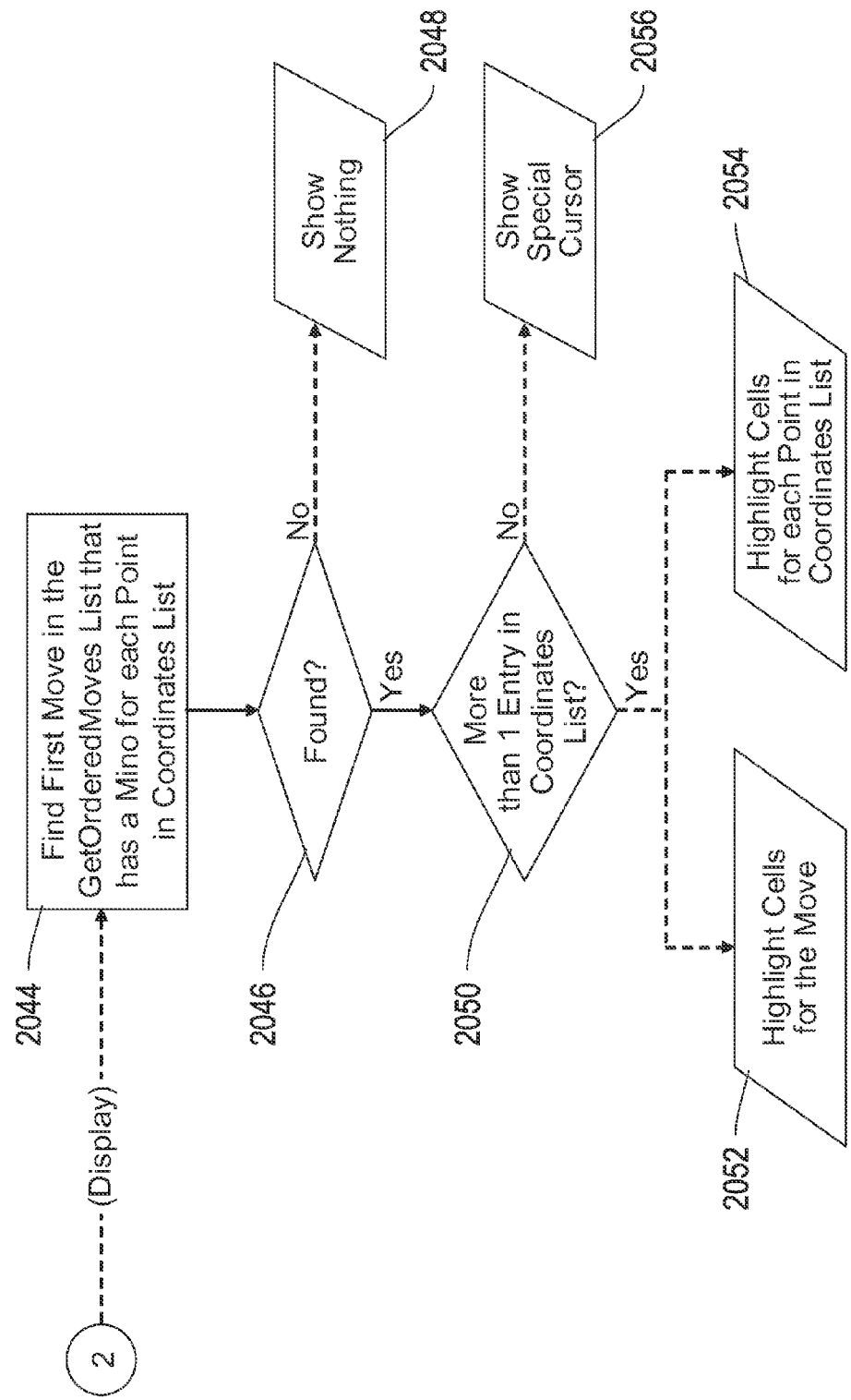
Figure 21A:
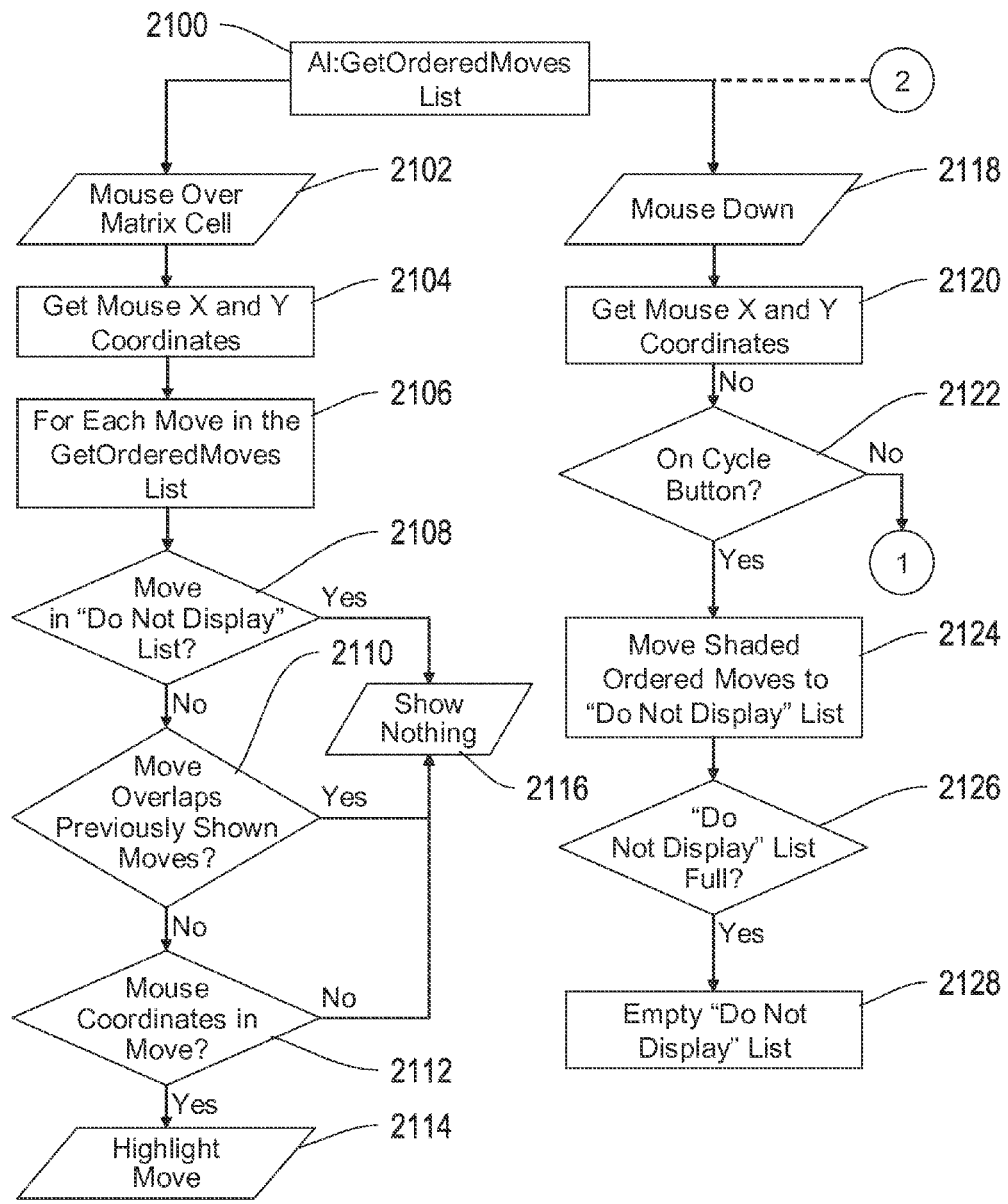
Figure 21B:
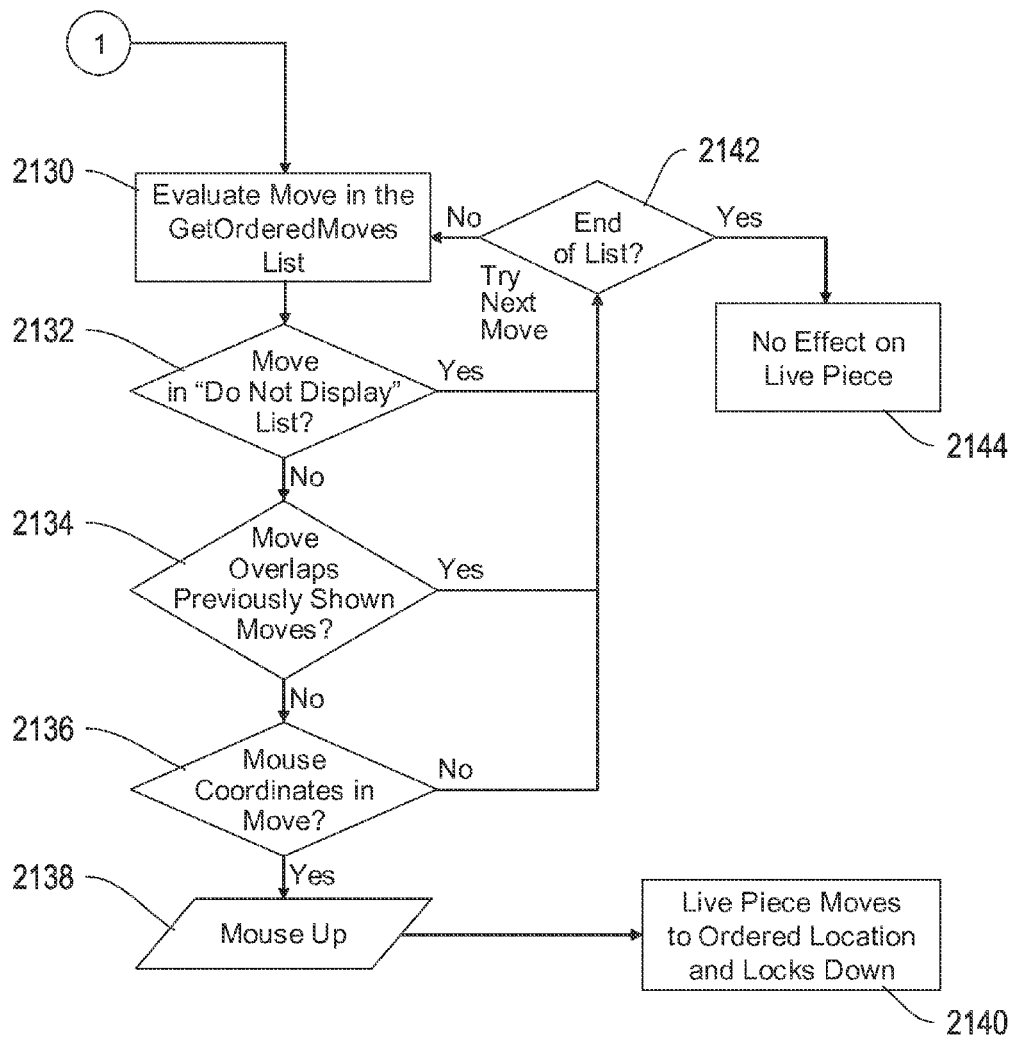
Figure 21C:
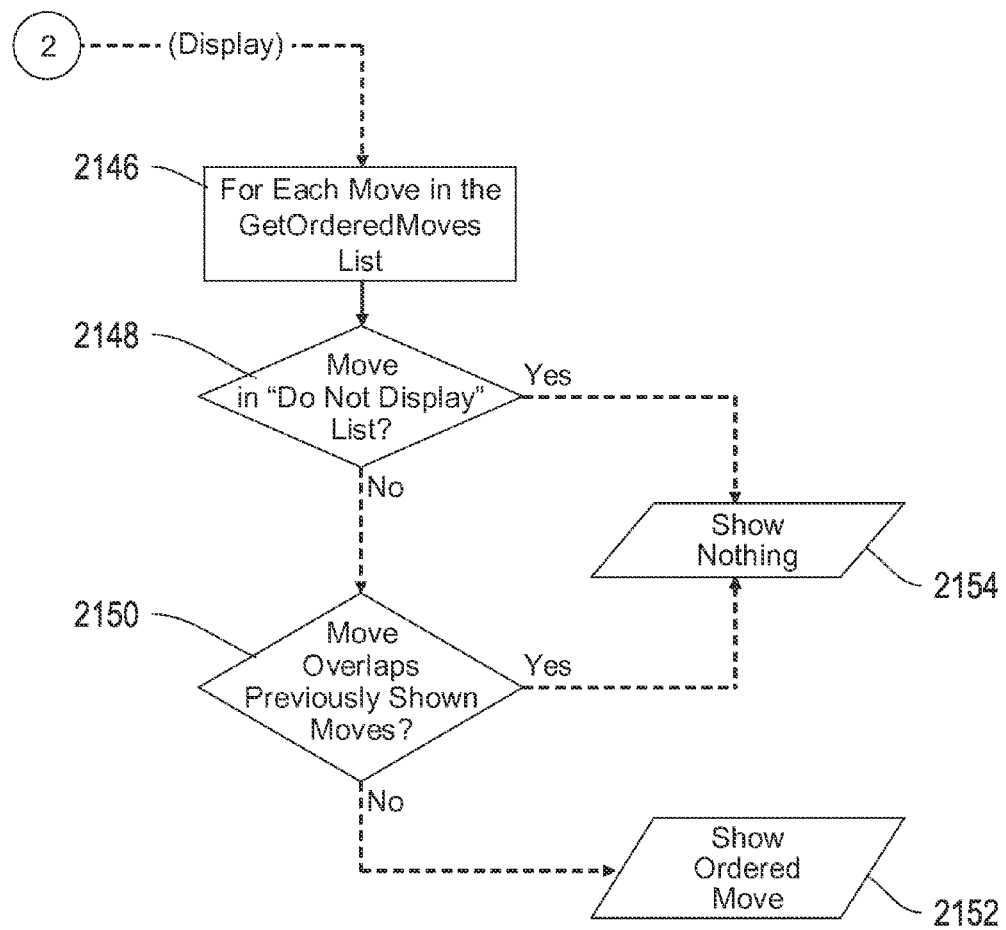

FIGS. 18A, 18B, and 18C include steps 1802-1850 associated with a possible fit view mouse control process. FIGS. 19A, 19B, and 19C include steps 1902-1962 associated with a best fit view mouse control process. FIGS. 20A, 20B, and 20C include steps 2002-2054 associated with another possible fit view mouse control process. FIGS. 21A, 21B, and 21C include steps 2102-2154 associated with another best fit view mouse control process.

The disclosed systems and methods can further support an online multi-player platform allowing multiple users to play puzzle games together. The game system can allow multiple players to play against one another and/or form teams to play against other teams. In some instances, the disclosed systems and methods can provide information to one or more players related to the gaming progressing of some other players.

It will be apparent to those of ordinary skill in the art that methods involved in the present invention may be embodied in a computer program product that includes a computer usable and/or readable medium. For example, such a computer usable medium may consist of a read only memory device, such as a CD ROM disk, conventional ROM devices, or a random access memory, a hard drive device or a computer diskette, a flash memory, a DVD, or any like digital memory medium, having a computer readable program code stored thereon.

Persons skilled in the art will appreciate that the various configurations described herein may be combined without departing from the present invention. It will also be recognized that the invention may take many forms other than those disclosed in this specification. Accordingly, it is emphasized that the invention is not limited to the disclosed methods, systems and apparatuses, but is intended to include variations to and modifications thereof as understood by those skilled in the art with respect to the following claims.

What is claimed is:

1. A system for manipulating a first object in relation to one or more other objects comprising:
    a computer;
    a computer readable medium, operatively coupled to the computer, the computer readable medium storing program codes causing the computer to execute a game by performing functions comprising:
        displaying the one or more other objects on a display such that each of the one or more other objects has a geometric shape, is arranged in an orientation of the geometric shape, and is non-overlapping with respect to any other objects;
        displaying the first object in a first position on the display, the first object having a geometric shape and being arranged in a first orientation of the geometric shape;
        determining one or more best destination position and orientation candidates of the object based on at least one of a selected portion of the display, the geometric shape of the object, the geometric shape of one or more subsequently available objects, one or more possible destination position and orientation candidates, the height to width ratio of an object or the other objects, the number and position of any empty cells next to the other objects, any gaps next to the other objects, and any empty cells or gaps subsequent to positioning and orienting the object;
        wherein the one or more best candidates include a first set of best destination position and orientation candidates and a second set of best destination position and orientation candidates;
        displaying the one or more candidates in a format other than a format for the first object and the one or more other objects, wherein the format includes at least one of a color, shading, transparency, texture, and patterning;
        displaying the second set of best destination position and orientation candidates instead of the first set of best destination position and orientation candidates in response to a second input of the user;
        receiving a user input from a user to select a destination position and orientation of the first object, wherein the destination position is next to at least one of the one or more other objects, the first object being non-overlapping with respect to any one of the other objects, wherein the user input includes selecting a portion of the display associated with the destination position and selecting a portion of one of the best destination position and orientation candidates; and
        positioning and orienting the object at the destination position and orientation in response to the user input;
        wherein determining includes determining an order or rank of the one or more best candidates such that the first set of candidates includes candidates having a higher order or rank than candidates of the second set.

2. The system of claim 1, wherein the computer performs functions comprising displaying one or more destination position and orientation candidates, and wherein the user input includes selecting a destination position and orientation candidate.

3. The system of claim 2, wherein the computer performs functions comprising adjusting the portion of the display corresponding to the one or more destination position and orientation candidates.

4. The system of claim 3, wherein adjusting includes highlighting one or more cells of the display, the one or more cells including a shape of a mino of at least one of a tetromino, trimino, pentomino, and polyomino.

5. The system of claim 4, wherein the user input includes clicking and holding a pointing device button.

6. The system of claim 1, wherein the computer performs functions comprising determining a best destination position and orientation of the object based on at least one of a selected portion of the display, the geometric shape of the object, the geometric shape of one or more subsequently available objects, one or more possible destination position and orientation candidates, the height to width ratio of an object or the other objects, the number and position of any empty cells next to the other objects, any gaps next to the other objects, any empty cells or gaps subsequent to positioning and orienting the object.

7. The system of claim 6, wherein the user input includes selecting a portion of the display.

8. The system of claim 7, wherein the selected portion of the display includes one or more cells, each cell including the shape of a mino of at least one of a tetromino, trimino, pentomino, and polyomino.

9. The system of claim 8, wherein the destination position and orientation corresponds to the determined best destination position and orientation.

10. The system of claim 1, wherein the second input of the user includes selecting a button on the display.

11. The system of claim 1, wherein the one or more best destination position and orientation candidates do not overlap and are not next to each other.

12. The system of claim 1, wherein the computer performs functions comprising setting a time limit for manipulating the first object from when the first object is first displayed.

13. The system of claim 12, wherein the computer performs functions comprising moving the first object from a first position toward a second position on the display at a rate of movement.

14. The system of claim 13, wherein the time limit is based on the rate of movement of the first object and the second position on the display.

15. The system of claim 1, wherein the geometric shape is two-dimensional.

16. The system of claim 15, wherein the geometric shape includes at least one of a tetromino, trimino, pentomino, and polyomino.

17. The system of claim 1, wherein the geometric shape is three-dimensional.

18. A portable electronic device for manipulating a first object in relation to one or more other objects comprising:
    a display arranged to i) display the one or more other objects such that each of the one or more other objects has a geometric shape and is arranged in an orientation of the geometric shape, each of the one or more other objects being non-overlapping with respect to any other objects, ii) display the first object in a first position on the display, the first object having a geometric shape and being arranged in a first orientation of the geometric shape, iii) display one or more candidates in a format other than a format for the first object and the one or more other objects, wherein the format includes at least one of a color, shading, transparency, texture, and patterning, and iv) display a second set of best destination position and orientation candidates instead of a first set of best destination position and orientation candidates in response to a second input of the user;

a user interface arranged to receive a user input from a user to select a destination position and orientation of the first object, wherein the destination position is next to at least one of the one or more other objects, the first object being non-overlapping with respect to any one of the other objects, wherein the user input includes selecting a portion of the display associated with the destination position and selecting a portion of one of the best destination position and orientation candidates; and a processor in communication with the display and user interface arranged to execute a game by i) positioning and orienting the object at the destination position and orientation in response to the user input and ii) determining the one or more best destination position and orientation candidates of the object based on at least one of a selected portion of the display, the geometric shape of the object, the geometric shape of one or more subsequently available objects, one or more possible destination position and orientation candidates, the height to width ratio of an object or the other objects, the number and position of any empty cells next to the other objects, any gaps next to the other objects, and any empty cells or gaps subsequent to positioning and orienting the object;

wherein the one or more best candidates include the first set of best destination position and orientation candidates and the second set of best destination position and orientation candidates; and wherein determining includes determining an order or rank of the one or more best candidates such that the first set of candidates includes candidates having a higher order or rank than candidates of the second set.

* * * * *